United States Patent
Mondal et al.

(10) Patent No.: US 10,517,011 B2
(45) Date of Patent: Dec. 24, 2019

(54) AUTOMATED MEASUREMENT AND ANALYSIS OF END-TO-END PERFORMANCE OF VOLTE SERVICE

(71) Applicant: Telefonaktiebolaget L M Ericsson (publ), Stockholm (SE)

(72) Inventors: Surajit Mondal, Gurgaon (IN); Debasish Sarkar, Irvine, CA (US); Ayan Sen, Gurgaon (IN); Jaspal Singh, Gurgaon (IN); Narendra Kumar Singh, Delhi (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 260 days.

(21) Appl. No.: 14/540,306

(22) Filed: Nov. 13, 2014

(65) Prior Publication Data
US 2016/0142931 A1   May 19, 2016

(51) Int. Cl.
*H04W 28/02* (2009.01)
*H04W 76/27* (2018.01)
(Continued)

(52) U.S. Cl.
CPC ....... *H04W 28/0236* (2013.01); *H04L 67/141* (2013.01); *H04W 24/08* (2013.01);
(Continued)

(58) Field of Classification Search
CPC ..... H04L 41/08; H04L 41/5032; H04L 43/04; H04L 43/06; H04L 65/1043; H04L 65/80; H04L 67/141
(Continued)

(56) References Cited

U.S. PATENT DOCUMENTS 9,237,474 B2 *   1/2016   Hui ........................ H04W 24/10
9,253,704 B1 *   2/2016   Sarkar ................... H04W 36/30
(Continued)

FOREIGN PATENT DOCUMENTS

EP   2219323 A1   8/2010

OTHER PUBLICATIONS

International Search Report and Written Opinion for International Patent Application No. PCT/IB2015/058715, dated Feb. 4, 2016, 12 pages.

(Continued)

*Primary Examiner* — Omar J Ghowrwal
*Assistant Examiner* — Kokou R Detse
(74) *Attorney, Agent, or Firm* — Withrow & Terranova, PLLC

(57) ABSTRACT

Systems and methods are disclosed herein that relate to automated measurement and analysis of end-to-end performance of Voice over Long Term Evolution (VoLTE) service and, in some embodiments, automated network optimization for VoLTE service performance improvement. In some embodiments, a method of operation of a network node to perform automated end-to-end analysis of VoLTE sessions is provided. In some embodiments, the method of operation of the network node comprises correlating control and data plane messages across a nodes and interfaces in a VoLTE network to thereby provide data representative of end-to-end message flows for a plurality of VoLTE sessions. The method of operation further comprises configuring one or more nodes in the VoLTE network based on the data representative of the end-to-end message flows for the plurality of VoLTE sessions. In this manner, automated network optimization for VoLTE service performance improvement can be provided.

20 Claims, 31 Drawing Sheets

(51) Int. Cl.
*H04W 76/12* (2018.01)
*H04W 24/08* (2009.01)
*H04L 29/08* (2006.01)
*H04W 28/06* (2009.01)

(52) U.S. Cl.
CPC .......... *H04W 28/06* (2013.01); *H04W 76/12* (2018.02); *H04W 76/27* (2018.02)

(58) Field of Classification Search
USPC ....................................................... 370/252
See application file for complete search history.

(56) References Cited

U.S. PATENT DOCUMENTS

| | | | |
|---|---|---|---|
| 2003/0002480 A1* | 1/2003 | Giustina | H04L 29/1216 370/352 |
| 2010/0142407 A1* | 6/2010 | Serravalle | H04W 8/26 370/254 |
| 2010/0285791 A1* | 11/2010 | Pirskanen | H04W 74/002 455/422.1 |
| 2011/0122866 A1* | 5/2011 | Vasamsetti | H04L 41/12 370/352 |
| 2012/0157088 A1 | 6/2012 | Gerber et al. | |
| 2013/0021933 A1* | 1/2013 | Kovvali | H04W 28/0236 370/252 |
| 2013/0170386 A1* | 7/2013 | Gonzalez De Langarica | H04L 41/12 370/252 |
| 2013/0170431 A1* | 7/2013 | Mann | H04M 15/66 370/328 |
| 2014/0016582 A1 | 1/2014 | Prakash et al. | |
| 2014/0064156 A1* | 3/2014 | Paladugu | H04W 28/0268 370/259 |
| 2014/0219100 A1* | 8/2014 | Pandey | H04W 28/08 370/236 |
| 2014/0241243 A1* | 8/2014 | Singh | H04L 1/08 370/328 |
| 2015/0230267 A1* | 8/2015 | Lee | H04W 74/0875 370/336 |
| 2015/0281974 A1* | 10/2015 | Ghasemzadeh | H04W 16/14 455/454 |

OTHER PUBLICATIONS

Author Unknown, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," Technical Specification 29.274, Version 12.3.0, Dec. 2013, 3GPP Organizational Partners, 236 pages.

Author Unknown, "3rd Generation Partnership Project; Technical Specification Group Radio Access Network; Evolved Universal Terrestrial Radio Access (E-UTRA); Radio Resource Control (RRC); Protocol specification (Release 12)," Technical Specification 36.331, Version 12.0.0, Dec. 2013, 3GPP Organizational Partners, 349 pages.

Author Unknown, "3rd Generation Partnership Project; Technical Specification Group Radio Access Network; Evolved Universal Terrestrial Radio Access Network (E-UTRAN); S1 Application Protocol (S1AP) (Release 12)," Technical Specification 36.413, Version 12.0.0, Dec. 2013, 3GPP Organizational Partners, 278 pages.

* cited by examiner

| Message | eNB-UE-S1AP-ID | MME Group ID | MME Code | M-TMSI | cell-ID | RRC-Establishment Cause | MME-UE-S1AP-ID | transport LayerAddress | gTP-TEID | e-RAB-ID | qCI | Cause |
|---|---|---|---|---|---|---|---|---|---|---|---|---|
| INITIAL UE MESSAGE | Y | Y | Y | Y | Y | Y | | | | | | |
| DOWNLINK_NAS_TRANSPORT | Y | | | | | | Y | | | | | |
| UPLINK_NAS_TRANSPORT | Y | | | | Y | | Y | | | | | |
| INITIAL_CONTEXT_SETUP_REQUEST | Y | | | | | | Y | Y | Y | Y | Y | |
| UE CAPABILITY INFORMATION INDICATION | Y | | | | | | Y | | | | | |
| INITIAL_CONTEXT_SETUP_RESPONSE | Y | | | | | | Y | Y | Y | Y | | |
| E-RAB SETUP REQUEST | Y | | | | | | Y | Y | Y | Y | Y | |
| E-RAB_SETUP_RESPONSE | Y | | | | | | Y | Y | Y | Y | | |
| UE CONTEXT RELEASE REQUEST | Y | | | | | | Y | | | | | Y |
| UE CONTEXT RELEASE COMMAND | Y | | | | | | Y | | | | | Y |
| UE CONTEXT RELEASE COMPLETE | Y | | | | | | Y | | | | | |

*FIG. 7B*

| Message | Tunnel Endpoint Identifier | IMSI | MSISDN | MEI | E-UTRAN Cell Identifier | Cause | F-TEID S1-U SGW GTP-U Interface TEID/ GRE Key | F-TEID S1-U eNodeB GTP-U Interface TEID/ GRE Key | EPS Bearer ID |
|---|---|---|---|---|---|---|---|---|---|
| Create Session Request | Y | Y | Y | Y | Y | | | | Y |
| Create Session Response | Y | | | | | Y | Y | | Y |
| Modify Bearer Request | Y | | | | | | | Y | Y |
| Modify Bearer Response | Y | | | | | Y | Y | | Y |
| Release Access Bearers Request | Y | | | | | | | | |
| Release Access Bearers Response | Y | | | | | Y | | | |

FIG. 8B

```
E-RABSetupRequest ::= SEQUENCE {
protocolIEs ProtocolIE-Container { {E-RABSetupRequestIEs} },
...
}

E-RABSetupRequestIEs S1AP-PROTOCOL-IES ::= {
{ ID id-MME-UE-S1AP-ID CRITICALITY reject TYPE MME-UE-S1AP-ID PRESENCE mandatory }|
{ ID id-eNB-UE-S1AP-ID CRITICALITY reject TYPE ENB-UE-S1AP-ID PRESENCE mandatory }|
{ ID id-uEaggregateMaximumBitrate CRITICALITY reject TYPE UEAggregateMaximumBitrate PRESENCE optional }|
{ ID id-E-RABToBeSetupListBearerSUReq CRITICALITY reject TYPE E-RABToBeSetupListBearerSUReq PRESENCE mandatory },
...
}

E-RABToBeSetupListBearerSUReq ::= SEQUENCE (SIZE(1.. maxNrOfE-RABs)) OF ProtocolIE-SingleContainer { {E-RABToBeSetupItemBearerSUReqIEs} }
E-RABToBeSetupItemBearerSUReqIEs S1AP-PROTOCOL-IES ::= {
{ ID id-E-RABToBeSetupItemBearerSUReq CRITICALITY reject TYPE E-RABToBeSetupItemBearerSUReq PRESENCE mandatory },
...
}

E-RABToBeSetupItemBearerSUReq ::= SEQUENCE {
e-RAB-ID       E-RAB-ID,
e-RABlevelQoSParameters   E-RABLevelQoSParameters,
transportLayerAddress       TransportLayerAddress,
gTP-TEID       GTP-TEID,
nAS-PDU        NAS-PDU,
iE-Extensions ProtocolExtensionContainer { {E-RABToBeSetupItemBearerSUReqExtIEs} } OPTIONAL,
...
}

E-RABLevelQoSParameters ::= SEQUENCE {
qCI QCI,
allocationRetentionPriority AllocationAndRetentionPriority,
gbrQosInformation GBR-QosInformation OPTIONAL,
iE-Extensions ProtocolExtensionContainer { {E-RABQoSParameters-ExtIEs} } OPTIONAL,
...
}
```

*FIG. 16*

```
E-RABSetupResponseIEs S1AP-PROTOCOL-IES ::= {
{ID id-MME-UE-S1AP-ID CRITICALITY ignore TYPE MME-UE-S1AP-ID PRESENCE mandatory}
{ID id-eNB-UE-S1AP-ID CRITICALITY ignore TYPE ENB-UE-S1AP-ID PRESENCE mandatory}
{ID id-E-RABSetupListBearerSURes CRITICALITY ignore TYPE E-RABSetupListBearerSURes PRESENCE optional}
{ID id-E-RABFailedToSetupListBearerSURes CRITICALITY ignore TYPE E-RABList PRESENCE optional}
{ID id-CriticalityDiagnostics CRITICALITY ignore TYPE CriticalityDiagnostics PRESENCE optional},
...}

E-RABList ::= SEQUENCE (SIZE(1.. maxNrOfE-RABs)) OF ProtocolIE-SingleContainer { {E-RABItemIEs} }

E-RABItemIEs S1AP-PROTOCOL-IES ::= {
{ID id-E-RABItem CRITICALITY ignore TYPE E-RABItem PRESENCE mandatory},
...}

E-RABItem ::= SEQUENCE {
e-RAB-ID E-RAB-ID,
cause Cause,
iE-Extensions ProtocolExtensionContainer { {E-RABItem-ExtIEs} } OPTIONAL,
...}

CauseRadioNetwork
{...
not-supported-QCI-value
...}
```

*FIG. 17*

```
RRCConnectionReestablishmentRequest ::= SEQUENCE {
criticalExtensions CHOICE {
rrcConnectionReestablishmentRequest-r8
RRCConnectionReestablishmentRequest-r8-IEs,
criticalExtensionsFuture SEQUENCE {}
}

RRCConnectionReestablishmentRequest-r8-IEs ::= SEQUENCE {
ue-Identity ReestabUE-Identity,
reestablishmentCause ReestablishmentCause,
spare BIT STRING (SIZE (2))
}

ReestabUE-Identity ::= SEQUENCE {
c-RNTI C-RNTI,
physCellId PhysCellId,
shortMAC-I ShortMAC-I
}

ReestablishmentCause ::= ENUMERATED {
reconfigurationFailure, handoverFailure,
otherFailure, spare1}
```

FIG. 24

```
RRCConnectionReestablishmentReject ::= SEQUENCE {
    criticalExtensions CHOICE {
        rrcConnectionReestablishmentReject-r8
            RRCConnectionReestablishmentReject-r8-IEs,
        criticalExtensionsFuture SEQUENCE {}
    }
}

RRCConnectionReestablishmentReject-r8-IEs ::= SEQUENCE {
    nonCriticalExtension RRCConnectionReestablishmentReject-v8a0-IEs
        OPTIONAL
}

RRCConnectionReestablishmentReject-v8a0-IEs ::= SEQUENCE {
    lateNonCriticalExtension OCTET STRING OPTIONAL, -- Need OP
    nonCriticalExtension SEQUENCE {} OPTIONAL -- Need OP
}
```

*FIG. 25*

AUTOMATED MEASUREMENT AND ANALYSIS OF END-TO-END PERFORMANCE OF VOLTE SERVICE

FIELD OF THE DISCLOSURE

The present disclosure relates to automated measurement and analysis of end-to-end performance of Voice over Long Term Evolution (VoLTE) service and, in some embodiments, automated network optimization for VoLTE service performance improvement.

BACKGROUND

Voice over Long Term Evolution (VoLTE) is deployed using Internet Protocol Multimedia Subsystem (IMS) and customized Radio Access Network (RAN) features to enable voice services alongside other services that use high-speed data. IMS provides the interconnection/gateway functionalities that allow VoLTE devices to communicate with non-VoLTE devices or even non-wireless devices. Session Initiation Protocol (SIP) defines the signaling necessary for call establishment, tear-down, authentication, registration, and presence maintenance, as well as enabling supplementary services like three-way calling and call waiting.

For effective analysis and troubleshooting of a VoLTE session, engineers need to look into several interface messages and analyze performance indicators calculated based on messages and information elements pertaining to those messages. Engineers need to know how IMS is setting up the session, how intermediate protocols are setting up the required bearers, how the enhanced, or evolved, Node B (eNB) is channelizing the over air interface, what the effective Quality of Service (QoS) experienced by the user over the radio interface is, etc. This becomes more and more complex with multi-vendor network elements. So, in practice, VoLTE service testing, troubleshooting, and optimization on a live network is one of the biggest challenges experienced by service providers and vendors involved in design and optimization services.

Thus, there is a need for systems and methods for automated measurement and analysis of end-to-end performance of VoLTE service.

SUMMARY

Systems and methods are disclosed herein that relate to automated measurement and analysis of end-to-end performance of Voice over Long Term Evolution (VoLTE) service and, in some embodiments, automated network optimization for VoLTE service performance improvement. In some embodiments, a method of operation of a network node to perform automated end-to-end analysis of VoLTE sessions is provided. In some embodiments, the method of operation of the network node comprises correlating control and data plane messages across nodes and interfaces in a VoLTE network to thereby provide data representative of end-to-end message flows for a plurality of VoLTE sessions. The method of operation further comprises configuring one or more nodes in the VoLTE network based on the data representative of the end-to-end message flows for the plurality of VoLTE sessions. In this manner, automated network optimization for VoLTE service performance improvement can be provided.

In some embodiments, correlating the control and data plane messages across the nodes and interfaces in the VoLTE network comprises bundling control and/or data messages for each of multiple protocols that define the control and data plane messages for the nodes and interfaces in the VoLTE network for each of the VoLTE sessions to thereby provide a message bundle for each of the VoLTE sessions for each of the protocols. Correlating the control and data plane messages further comprises correlating the message bundles across the protocols for each of the VoLTE sessions to thereby provide the data representative of the end-to-end message flows for the VoLTE sessions.

Further, in some embodiments, bundling the control and/or data messages for each of the protocols for each of the VoLTE sessions comprises bundling Radio Resource Control (RRC) messages according to rlc.channel.ueid.

In some embodiments, bundling the control and/or data messages for each of the protocols for each of the VoLTE sessions comprises bundling X2 Application Protocol (AP) messages according to a unique pair of old-eNB-UE-X2AP-ID and new-eNB-UE-X2AP-ID.

In some embodiments, bundling the control and/or data messages for each of the protocols for each of the VoLTE sessions comprises bundling S1 AP messages according to a unique pair of eNB-UE-S1AP-ID and MME-UE-S1AP-ID.

In some embodiments, bundling the control and/or data messages for each of the protocols for each of the VoLTE sessions comprises bundling General Packet Radio Service (GPRS) Tunneling Protocol version 2 (GTPv2) protocol messages according to a unique pair of Tunnel Endpoint Identifiers (TEIDs).

In some embodiments, bundling the control and/or data messages for each of the protocols for each of the VoLTE sessions comprises bundling Session Initiation Protocol (SIP) messages based on sip.Call-IDs and sip.P-Charging-Vector.

In some embodiments, bundling the control and/or data messages for each of the protocols for each of the VoLTE sessions comprises bundling DIAMETER messages based on subscription-Identifier (ID).

In some embodiments, bundling the control and/or data messages for each of the protocols for each of the VoLTE sessions comprises bundling Real-Time Transfer Protocol (RTP) messages based on a unique pair of Synchronization Source (SSRC) identifiers.

In some embodiments, bundling the control and/or data messages for each of the protocols for each of the VoLTE sessions comprises bundling RRC messages to thereby provide a bundle of RRC messages for each of the VoLTE sessions, bundling X2AP messages to thereby provide a bundle of X2AP messages for each of the VoLTE sessions, and correlating the message bundles across the protocols for each of the VoLTE sessions comprises, for each VoLTE session, correlating the bundle of RRC messages for the VoLTE session and the bundle of X2AP messages for the VoLTE session based on Mobility Management Entity Group Identity (MMEGI) and Mobility Management Entity Code (MMEC).

In some embodiments, bundling the control and/or data messages for each of the protocols for each of the VoLTE sessions comprises bundling X2AP messages to thereby provide a bundle of X2AP messages for each of the VoLTE sessions and bundling S1AP messages to thereby provide a bundle of S1AP messages for each of the VoLTE sessions, and correlating the message bundles across the protocols for each of the VoLTE sessions comprises, for each VoLTE session, correlating the bundle of X2AP messages for the VoLTE session and the bundle of S1AP messages for the VoLTE session based on MME-UE-S1AP-ID.

In some embodiments, bundling the control and/or data messages for each of the protocols for each of the VoLTE sessions comprises bundling RRC messages to thereby provide a bundle of RRC messages for each of the VoLTE sessions and bundling S1AP messages to thereby provide a bundle of S1AP messages for each of the VoLTE sessions, and correlating the message bundles across the protocols for each of the VoLTE sessions comprises, for each VoLTE session, correlating the bundle of RRC messages for the VoLTE session and the bundle of S1AP messages for the VoLTE session based on MMEC and Mobility Management Entity Temporary Mobile Subscriber Identity (M-TMSI).

In some embodiments, bundling the control and/or data messages for each of the protocols for each of the VoLTE sessions comprises bundling S1AP messages to thereby provide a bundle of S1AP messages for each of the VoLTE sessions and bundling GTPv2 messages to thereby provide a bundle of GTPv2 messages for each of the VoLTE sessions, and correlating the message bundles across the protocols for each of the VoLTE sessions comprises, for each VoLTE session, correlating the bundle of S1AP messages for the VoLTE session and the bundle of GTPv2 messages for the VoLTE session based on S1AP-GTP-TEID and F-TEID S1-U SGW GTP-U INTERFACE TEID/GRE KEY.

In some embodiments, bundling the control and/or data messages for each of the protocols for each of the VoLTE sessions comprises bundling GTPv2 messages to thereby provide a bundle of GTPv2 messages for each of the VoLTE sessions and bundling SIP messages to thereby provide a bundle of SIP messages for each of the VoLTE sessions, and correlating the message bundles across the protocols for each of the VoLTE sessions comprises, for each VoLTE session, correlating the bundle of GTPv2 messages for the VoLTE session and the bundle of SIP messages for the VoLTE session based on Mobile Subscriber Integrated Services Digital Network Number (MSISDN).

In some embodiments, bundling the control and/or data messages for each of the protocols for each of the VoLTE sessions comprises bundling SIP messages to thereby provide a bundle of SIP messages for each of the VoLTE sessions and bundling RTP messages to thereby provide a bundle of RTP messages for each of the VoLTE sessions, and correlating the message bundles across the protocols for each of the VoLTE sessions comprises, for each VoLTE session, correlating the bundle of SIP messages for the VoLTE session and the bundle of RTP messages for the VoLTE session based on SIP.VIA.SENT-BY.ADDRESS and SIP.ROUTE-HOST in the bundle of SIP messages and IP.SRC and IP.DST in the bundle of RTP messages.

In some embodiments, configuring the one or more nodes in the VoLTE network comprises determining that one or more predefined conditions are satisfied based on the data representative of the end-to-end message flow of at least one of the VoLTE sessions, and adjusting a configuration for the one or more nodes in the VoLTE network in response to determining that the one or more predefined conditions are satisfied based on the data representative of the end-to-end message flow for at least one of the VoLTE sessions.

In some embodiments, configuring the one or more nodes in the VoLTE network comprises obtaining an Evolved Universal Terrestrial Radio Access Network (E-UTRAN) Radio Access Bearer (E-RAB) Identifier (E-RAB-ID) and Quality of Service Class Indicator (QCI) value from an E-RAB setup request in the data representative of the end-to-end message flow for one of the plurality of VoLTE sessions and determining that E-RAB setup was not successful for the VoLTE session based on an E-RAB setup response. In response to determining that the E-RAB setup was not successful, the configuring the one or more nodes further comprises determining that a failure cause included in the E-RAB setup response indicates that the E-RAB setup was not successful because the QCI value is not supported by a target base station for the E-RAB setup. In response to determining that the failure cause included in the E-RAB setup response indicates that the E-RAB setup was not successful because the QCI value is not supported by the target base station for the E-RAB setup, configuring the one or more nodes further comprises defining a QCI profile corresponding to the QCI value in the target base station.

In some embodiments, configuring the one or more nodes in the VoLTE network comprises determining that a first cell is a missing neighbor of a second cell based on the data representative of the end-to-end message flow for one of the VoLTE sessions and, in response, adding a neighbor relation for the first cell and the second cell.

Further, in some embodiments, determining that the first cell is a missing neighbor of the second cell comprises: determining that one or more bearers were successfully established for the VoLTE session based on the data representative of the end-to-end message flow for the VoLTE session; determining that an Internet Protocol Multimedia Subsystem (IMS) session was successfully established in an IMS for the VoLTE session based on the data representative of the end-to-end message flow for the VoLTE session; determining that an RRC reestablishment request was received from a wireless device due to a handover failure for the VoLTE session based on the data representative of the end-to-end message flow for the VoLTE session; determining that an RRC reestablishment request was rejected for the wireless device; determining that the VoLTE session was terminated abnormally; determining that the first cell to which the wireless device was connected prior to radio link failure is different than the second cell that rejected the RRC reestablishment request; determining that the first cell and the second cell are not defined as neighbors; and determining that a physical distance between the first cell and the second cell is less than a predefined threshold.

Embodiments of a network node enabled to perform automated end-to-end analysis of VoLTE sessions are also disclosed. In some embodiments, the network node comprises at least one processor and memory containing software executable by the at least one processor whereby the network node is configured to: correlate control and data plane messages across a plurality of nodes and interfaces in a VoLTE network to thereby provide data representative of end-to-end message flows for multiple VoLTE sessions and configure one or more nodes in the VoLTE network based on the data representative of the end-to-end message flows for the VoLTE sessions.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 7A and 7B illustrate bundling of S1AP messages for a VoLTE session according to some embodiments of the present disclosure;

FIGS. 8A and 8B illustrate bundling of General Packet Radio Service Tunneling Protocol version 2 (GTPv2) protocol messages for a VoLTE session according to some embodiments of the present disclosure;

Figure 14:
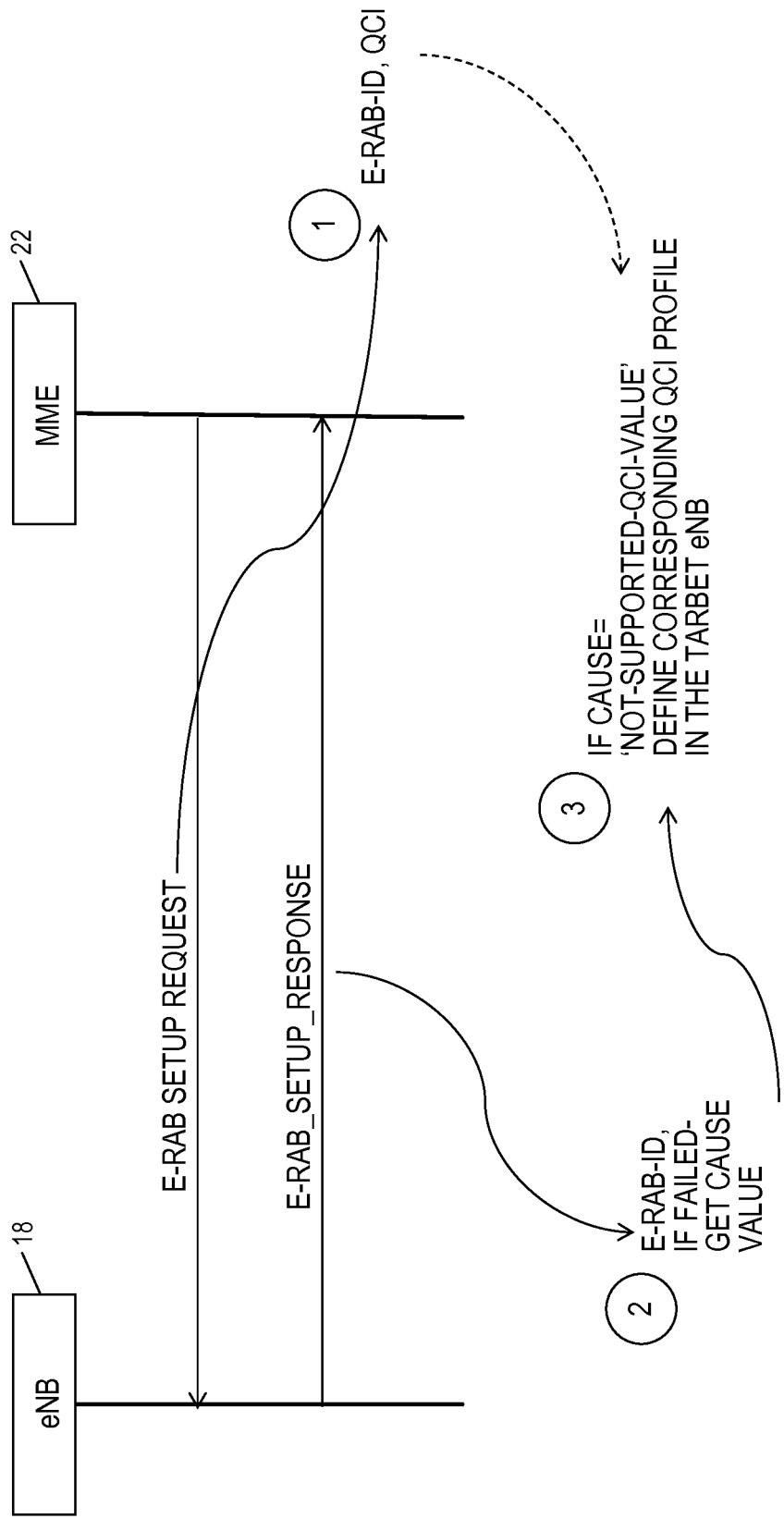
Figure 15:
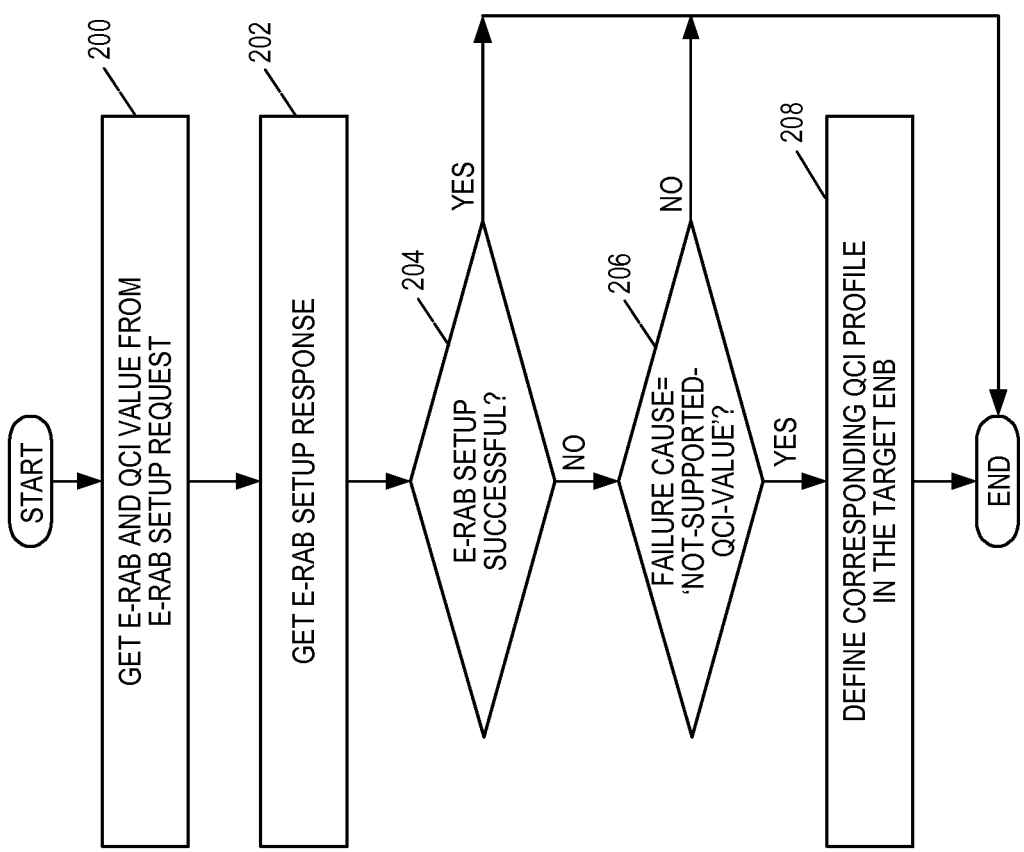
Figure 26:
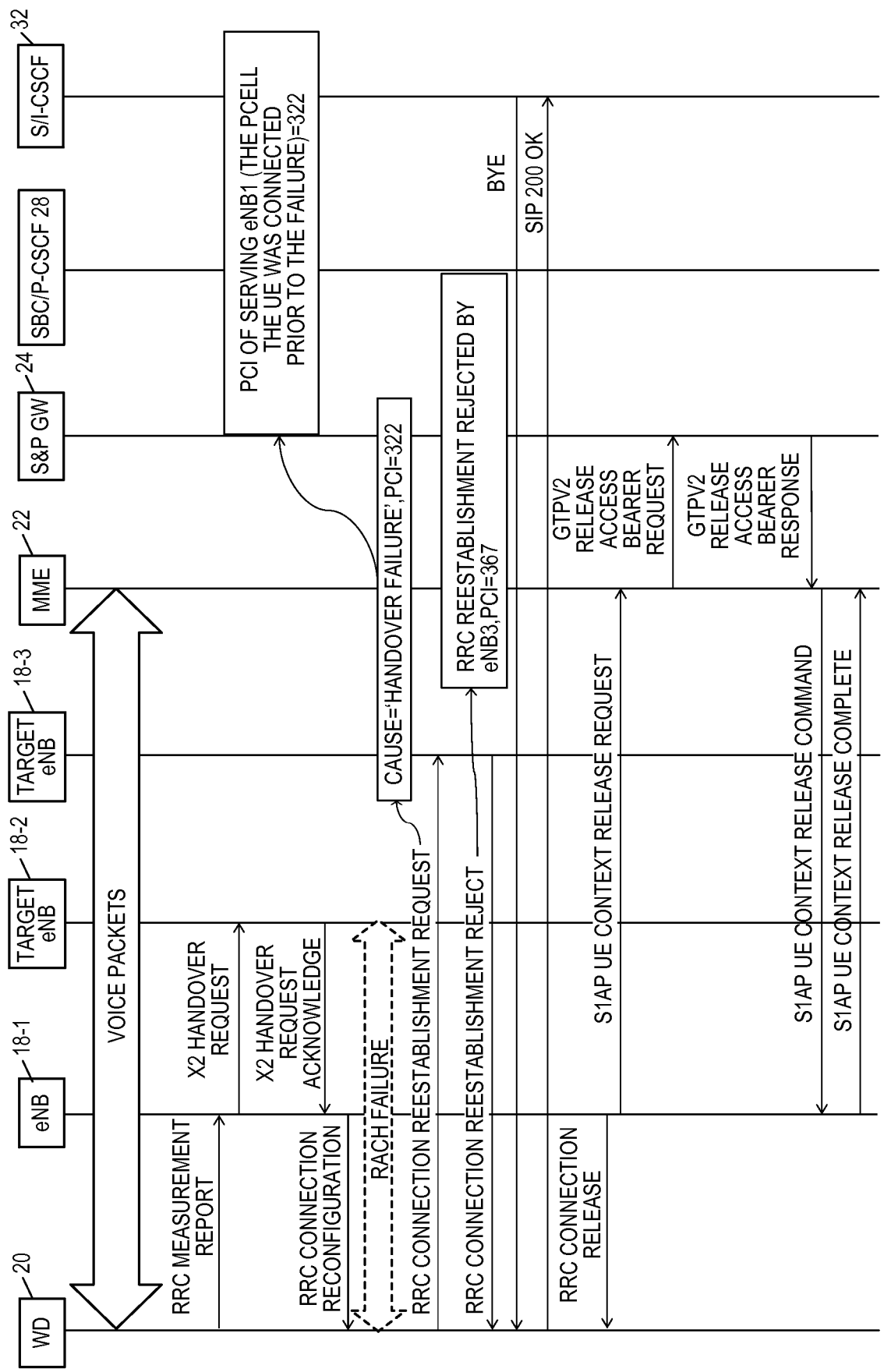
Figure 27:
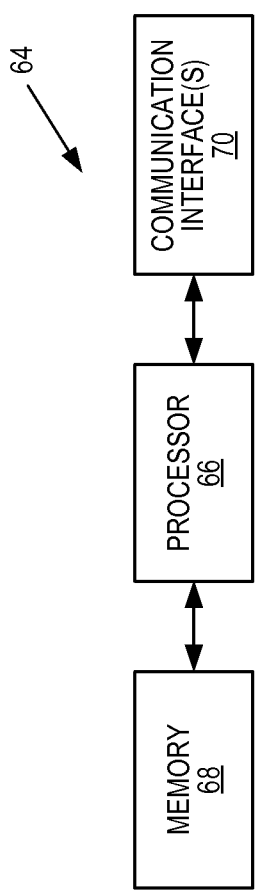
Figure 28:
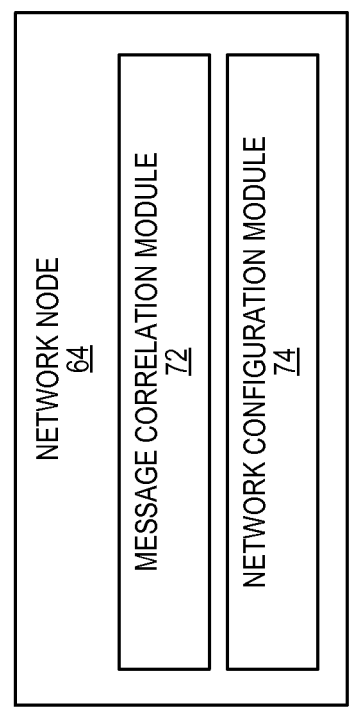

FIGS. 14 and 15 relate to a process for detecting and correcting a condition in which a requested Quality of Service Class Indicator (QCI) profile is not defined in a target base station for a handover during a VoLTE session according to some embodiments of the present disclosure;

FIG. 16 illustrates the structure of an Evolved Universal Radio Access Network Radio Access Bearer (E-RAB) setup request message;

FIG. 17 illustrates the structure of an E-RAB setup response message;

FIGS. 18 through 23 relate to a process for detecting and correcting a condition where there is an RRC Reestablishment rejection for a VoLTE session due to a missing neighbor relation according to some embodiments of the present disclosure;

FIGS. 24 and 25 illustrate the structure of an RRC Connection Reestablishment Request message and an RRC Connection Reestablishment Reject message, respectively;

FIG. 26 illustrates one example of a process for detecting and correcting a condition where there is an RRC Reestablishment rejection for a VoLTE session due to a missing neighbor relation according to some embodiments of the present disclosure;

FIG. 27 illustrates a network node according to some embodiments of the present disclosure; and FIG. 28 illustrates a network node according to other embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
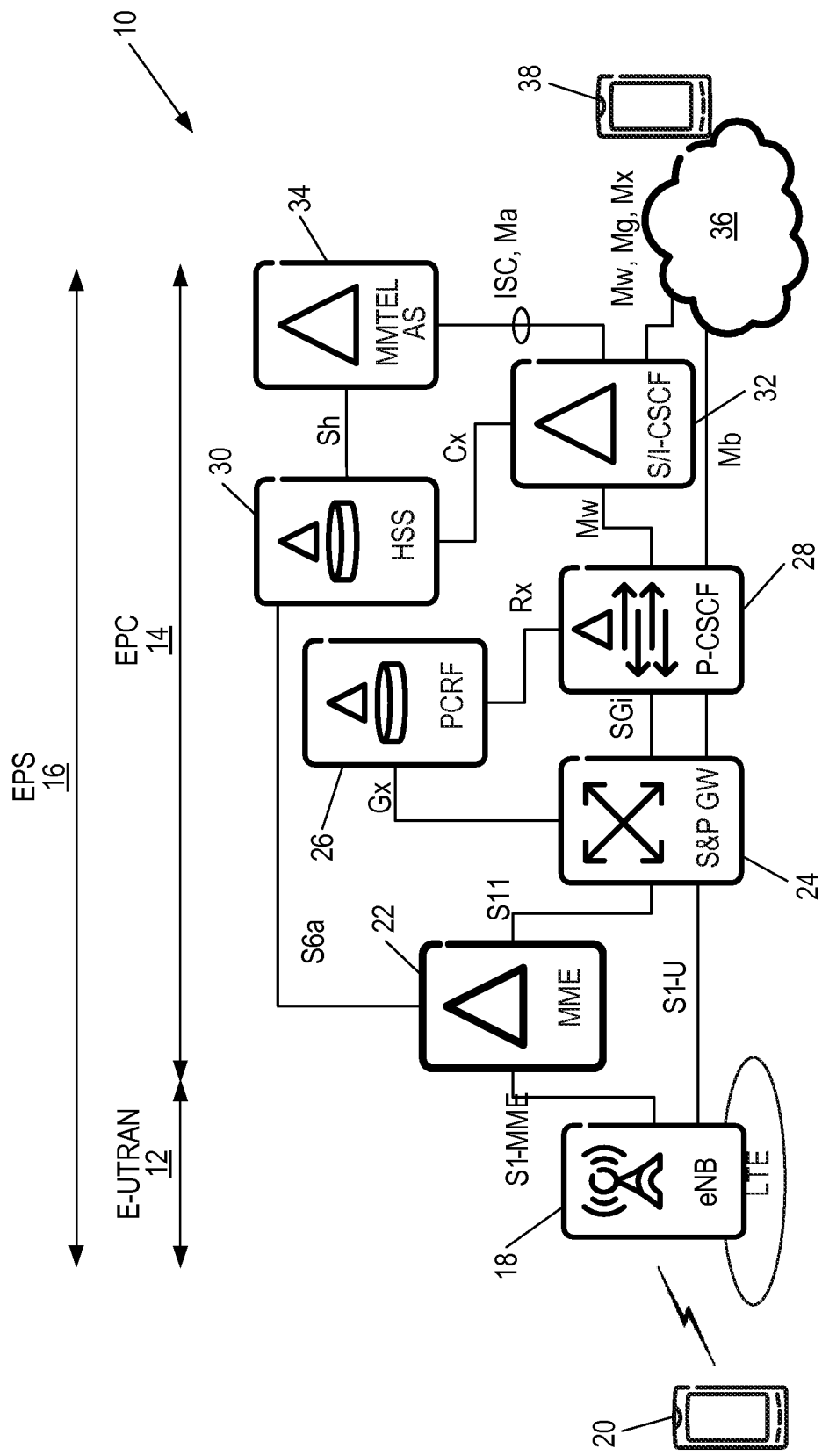
FIG. 1 illustrates a system including various network nodes and interfaces involved in a Voice over Long Term Evolution (VoLTE) session.

Systems and methods are disclosed herein that relate to automated measurement and analysis of end-to-end performance of Voice over Long Term Evolution (VoLTE) service and, in some embodiments, automated network optimization for VoLTE service performance improvement, which leads to a better-quality end user experience. In this regard, FIG. 1 illustrates a system 10 including the various network nodes involved in a VoLTE session. As illustrated, the system 10 includes an Evolved Universal Terrestrial Radio Access Network (E-UTRAN) 12 and an Evolved Packet Core (EPC) 14 that together form an Evolved Packet System (EPS) 16 for a Long Term Evolution (LTE) network. The E-UTRAN 12 includes an enhanced, or evolved, Node B (eNB) 18 that provides radio access to a wireless device 20, which in LTE terminology is referred to as a User Equipment (UE). The EPC 14 includes a Mobility Management Entity (MME) 22, a Serving and Packet Data Network (S&P) Gateway (GW) 24, a Policy and Charging Rules Function (PCRF) 26, a Proxy-Call Session Control Function (P-CSCF) 28, a Home Subscriber Server (HSS) 30, a Serving/Interrogating Call Session Control Function (S/I-CSCF) 32, and a Multimedia Telephony (MMTEL) Application Server (AS) 34.

The MME 22 is the control-plane node of the EPC 14. The MME 22 performs functions such as, for example, connection and release of bearers to wireless devices (e.g., the wireless device 20), handling of IDLE to ACTIVE transitions, and handling of security keys. The MME 22 also provides other functions such as tracking area list management, S&P GW 24 selection, MME selection for handoffs with MME changes, roaming via interface S6a with the HSS 30, bearer management functions including dedicated bearer establishment, etc. The S&P GW 24 is sometimes represented as separate Serving GW (S-GW) and Packet Data Network (PDN) GW (P-GW) nodes. With regard to the S-GW functionality, the S&P GW 24 is the data, or user, plane node connecting the EPC 14 to the E-UTRAN 12 (which is sometimes referred to as the LTE Radio Access Network (RAN)). In this regard, the S&P GW 24 operates as a mobility anchor when wireless devices (e.g., the wireless device 20) move between eNBs 18 and a mobility anchor for other 3$^{rd}$ Generation Partnership Project (3GPP) technologies (e.g., Global System for Mobile Communications (GSM)/General Packet Radio Service (GPRS), and High Speed Packet Access (HSPA)). With respect to the S-GW functionality, the S&P GW 24 may also provide additional functions such as, for example, uplink and downlink charging per wireless device, PDN, and Quality of Service (QoS) class identifier, packet routing and forwarding, etc. With regard to the P-GW functionality, the S&P GW 24 connects the EPC 14 to the Internet. In this regard, the S&P GW 24 handles Internet Protocol (IP) address allocation for the wireless devices (e.g., the wireless device 20) as well as QoS enforcement according to the policy controlled by the PCRF 26.

The PCRF 26 provides functions such as QoS handling and charging. The PCRF 26 interfaces with application functions such as the P-CSCF 28. The PCRF 26 interfaces with the S&P GW 24 to communicate policy decisions to the S&P GW 24. The P-CSCF 28 is the entry point to the Internet Protocol Multimedia Subsystem (IMS) domain and serves as the outbound proxy server for the wireless device 20. The wireless device 20 attaches to the P-CSCF 28 prior to performing IMS registrations and initiating Session Initiation Protocol (SIP) sessions.

The HSS 30 is a database containing subscriber data including, for example, Enhanced Presence Service QoS subscriber profile, roaming restrictions, accessible Access Point Names (APNs), address of current serving MME, current Tracking Area (TA) of a wireless device, authentication vectors and security keys per wireless device, etc.

Notably, several roles of SIP servers or proxies, collectively called Call Session Control Functions (CSCFs), are used to process SIP signaling packets in the IMS. These are P-CSCF, Serving CSCF (S-CSCF), and Interrogating CSCF (I-CSCF). The S-CSCF and the I-CSCF are generally referred to herein as the S/I-CSCF 32. Thus, when referring to the S-CSCF, the S-CSCF is referred to as the S-CSCF 32. Conversely, when referring to the I-CSCF, the I-CSCF is referred to as the I-CSCF 32. The S-CSCF 32 is the main SIP session control node within the overall IMS network. When a subscriber enters the network, the subscriber provides a contact address and a public user identity. This is provided to the S-CSCF 32. In view of its role within the IMS network, the S-CSCF 32 is seen as the registrar for the network, although the HSS 30 holds the data against which the S-CSCF 32 checks the authenticity of the subscriber requesting entry.

The I-CSCF 32 operates as an inbound SIP proxy server in the IMS. During IMS registration, the I-CSCF 32 queries the HSS 30 to select the appropriate S-CSCF 32 for serving the wireless device 20. The MMTEL AS 34 is a SIP application server for IP telephony and multimedia that enables VoLTE. One example of the MMTEL AS 34 is the Ericsson Multimedia Telephony Application Server Multimedia Telephony Application Server (MTAS) manufactured and sold by Ericsson.

The nodes 18 through 34 communicate via a number of interfaces. In particular, as illustrated in FIG. 1, the S1-MME interface is used for signaling between the eNB 18 and the MME 22. The S1-U interface defines the user-plane between the eNB 18 and the S&P GW 24. The S11 interface is used by the MME 22 to control path switching and bearer establishment in the S&P GW 24. The S6a interface is used by the MME 22 to retrieve subscriber data from the HSS 30. The Gx interface is used by the PCRF 26 to convey policy enforcement to the S&P GW 24 and is also used to retrieve traffic flow data. The SGi interface is the interface into the IP PDN. The Rx interface is used by application functions, such as the P-CSCF 28, to convey policy data to the PCRF 26. The Sh interface is the interface between the HSS 30 and the MMTEL AS 34. The Cx interface is the interface between the HSS 30 and the S/I-CSCF 32. The Mw interface is the interface between the P-CSCF 28 and the S/I-CSCF 32. The Mb interface is the interface between the P-CSCF 28 and a cloud 36, which represents everything between the edge of the EPS 16 and the terminating wireless device 38. The cloud 36 may include, for example, the Internet. The ISC, Ma interfaces are the interfaces between the MMTEL AS 34 and the S/I-CSCF 32. The Mw, Mg, and Mx interfaces are the interfaces between the S/I-CSCF 32 and the cloud 36.

One of the biggest challenges for VoLTE service is to characterize the performance and troubleshoot a successful or failed VoLTE session considering all the nodes and interfaces involved. As VoLTE is deployed over an LTE network using IMS, characterization of performance and troubleshooting of a successful or failed VoLTE session (e.g., a VoLTE session between the wireless device 20 and another wireless device 38) may require looking into, e.g., the SGi, Mw, Ma, and ISC interfaces along with the Uu, X2, S1, and S11 interfaces to consider the performance of wireless device 20, the eNB 18, the MME 22, the S&P GW 24, the Session Border Controller (SBC), the P-CSCF 28, the S-CSCF 32, the MMTEL AS 34, etc. While not illustrated in FIG. 1, the SBC is a device regularly deployed in Voice over Internet Protocol (VoIP) networks to exert control over the signaling and, usually, the media stream involved in setting up, conducting, and tearing down telephone calls or other interactive media communications. With the fundamental role of providing scalable, centralized service delivery, specifications related to IMS have defined an innovative approach to SBC based on distributed signaling/media architecture. Meanwhile, implementation models have extended SBC function to incorporate other IMS core functions such as the P-CSCF 32. The embodiments described herein use interface specific messages and information elements and will remain the same irrespective of whether an SBC is deployed or not. As such, an SBC is not illustrated in FIG. 1.

To identify whether a particular VoLTE session is experiencing any problem, it is preferable that the VoLTE session be characterized with indicators at all possible interfaces involved in transporting control and data, or user, plane messages or packets for that VoLTE session. Once a problematic VoLTE session is identified, it is desirable to analyze the root cause of the problem and pin-point the malefactor. To accomplish all the above tasks, there is a need for systems and methods that characterize the end-to-end message flow for a VoLTE session, preferably in an automated manner.

In this regard, systems and methods are disclosed herein that correlate messages/packets across the multiple nodes (e.g., the nodes 18 through 34) and/or interfaces (e.g., S1-MME, S1-U, S6a, S11, etc.) utilized for a VoLTE session to construct an end-to-end flow for the VoLTE session. In addition, relevant performance indicators may be calculated at each interface.

In addition, in some embodiments, the end-to-end flow for the VoLTE session is utilized to provide automated network optimization for VoLTE service performance improvement, which leads to a better quality end user experience. Two particular problems that, in some embodiments, are addressed herein are as follows. First, in practical situations, E-UTRAN Radio Access Bearer (E-RAB) setup fails for a VoLTE voice bearer (QCI=1) because of inconsistent Quality of Service Class Indicator (QCI) profile definition resulting in VoLTE service accessibility failures. Secondly, during handover, if a radio link failure occurs, a Radio Resource Control (RRC) connection reestablishment request is sometimes rejected to a new cell due to a missing neighbor relation. The automated end-to-end VoLTE session characterization techniques described herein may be used to detect and correct these problems. Note, however, that these problems are only two examples. The end-to-end message flows generated utilizing the embodiments described herein may be utilized to provide automated network optimization to address other types of problems and are not limited to being used for automated network optimization.

Figure 2:
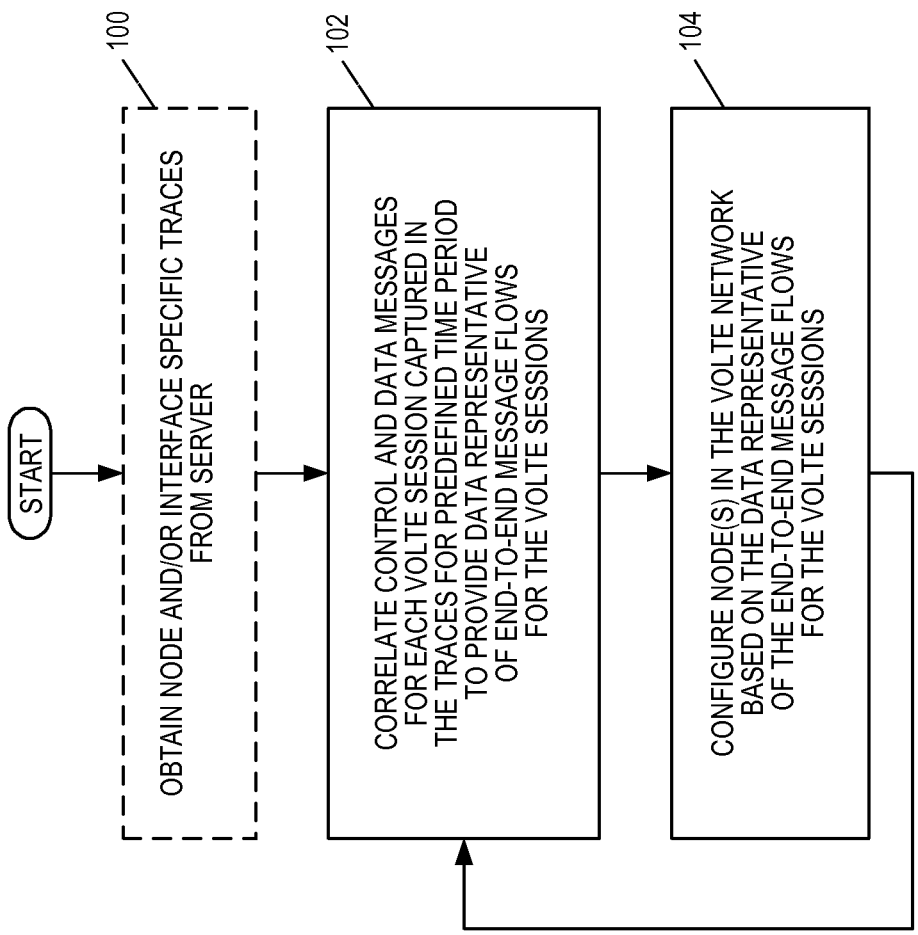
FIG. 2 illustrates a process for characterizing an end-to-end flow for one or more VoLTE sessions according to some embodiments of the present disclosure.

FIG. 2 illustrates a process for characterizing an end-to-end flow for one or more VoLTE sessions according to some embodiments of the present disclosure. In this example, the VoLTE session(s) includes a VoLTE session between the wireless devices 20 and 38 of FIG. 1. However, the process is not limited thereto. This process is performed by any suitable device(s) or system(s), which is referred to herein as an automated VoLTE characterization system, or simply a characterization system. For example, as discussed below, in some embodiments, the process is performed by a Self-Organizing Network (SON) server.

As illustrated, the characterization system obtains node and/or interface specific traces, or logs, from a server (step 100). In other words, the characterization system obtains traces for the nodes (e.g., some or all of the nodes 18 through 34) and the interfaces (e.g., some or all of the interfaces of the nodes 18 through 34) in the EPS 16. Notably, when relating to VoLTE sessions, the EPS 16 is sometimes referred to herein as a VoLTE network. Thus, as used herein, the VoLTE network is a network over which a VoLTE session(s) is provided. In the system 10 of FIG. 1, the VoLTE network is the EPS 16. Specifically, in some embodiments, a trace collection agent(s) collects node and/or interface specific traces, or logs, from the nodes (e.g., the nodes 18 through 34) and/or the interfaces (e.g., the S1-MME interface, the S1-U interface, etc.) and stores them on a server(s). The trace collection agent(s) may be implemented within one or more of the nodes 18 through 34 or implemented in a separate node. The traces, or logs, may be collected from the different points or nodes in the system 10 using any suitable collection process. Also, vendor specific network or node traces may be transferred to the server(s) via an Operations Support System (OSS). This collection process is not the subject of this disclosure.

The characterization system correlates the control and/or data messages for each VoLTE session captured in the traces for a predefined time period to provide data representative of end-to-end message flows for the VoLTE sessions (step 102). The data representative of the end-to-end message flows for the VoLTE sessions may be stored in a database for subsequent use. The details of this correlation are described below. However, in general, the messages pertaining to a particular VoLTE session are correlated within and across multiple protocols (e.g., RRC, X2AP, S1AP, etc.) in order to construct data indicative of an end-to-end message flow for each VoLTE session. In some embodiments, the data indicative of the end-to-end message flow for a VoLTE session is a collection of the correlated messages for that VoLTE session.

In some embodiments, the characterization system configures one or more nodes in the VoLTE network (i.e., the system 10 over which the VoLTE session is provided) based on the data representative of the end-to-end message flows for the VoLTE sessions (step 104). For example, as discussed below, the data representative of the end-to-end message flows may indicate that there is a missing neighbor relation for the eNB 18. In response, the characterization system may add the missing neighbor relation for the eNB 18. However, the data representative of the end-to-end message flows may be utilized to monitor for any number of type of condition of interest for, e.g., performance and/or troubleshooting. When a condition exists, then a corresponding action is taken by the characterization system to configure one or more nodes to address (e.g., correct) the detected condition. The process then returns to step 102 and is repeated for the next time period.

Figure 3:
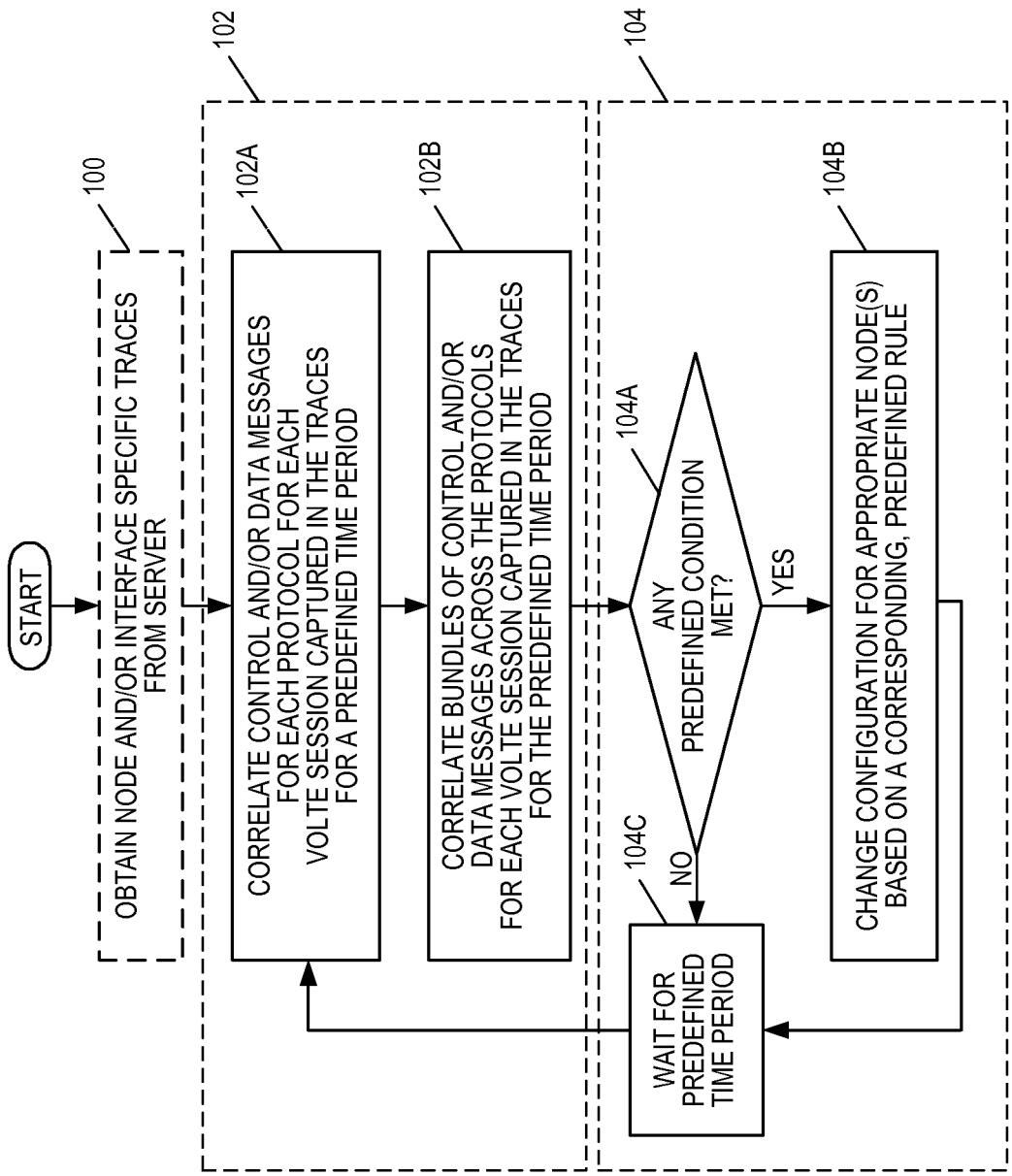
FIG. 3 illustrates the process of FIG. 2 in more detail according to some embodiments of the present disclosure.

FIG. 3 illustrates the process of FIG. 2 in more detail according to some embodiments of the present disclosure. As illustrated, the characterization system obtains node and/or interface specific traces from a server, as discussed above (step 100). The characterization system correlates the control and/or data messages for each VoLTE session captured in the traces for a predefined time period to provide data representative of end-to-end message flows for the VoLTE sessions (step 102). More specifically, the characterization system correlates control and/or data messages for each protocol for each VoLTE session captured in the traces for a predefined time period (step 102A). As discussed below, for each protocol (e.g., RRC, X2AP, S1AP, etc.), the messages for a particular VoLTE session can be correlated, or bundled, within that protocol using unique identifiers or combinations of unique identifiers that indicate that the messages belong to the same VoLTE session. In addition to correlating, or bundling, messages for each protocol, the characterization system correlates the resulting bundles of control and/or data messages across the protocols for each VoLTE session captured in the traces for the predefined time period (step 102B). Thus, for example, after bundling the RRC messages, the X2P messages, the S1AP messages, etc. for each of the VoLTE sessions, the messages for each VoLTE session are correlated across the different protocols. So, for example, the bundle of RRC messages for a VoLTE session will be correlated with the bundle of X2AP messages for the same VoLTE session, and so on.

Once the correlation is complete, the correlated messages both within and across the different protocols form data that is representative of the end-to-end message flows for each of the VoLTE sessions. In other words, for each VoLTE session, the messages correlated within and across the different protocols for that VoLTE session form data that is representative of the end-to-end message flows of that VoLTE session.

In some embodiments, the characterization system configures one or more nodes in the VoLTE network (i.e., the system 10 over which the VoLTE session is provided) based on the data representative of the end-to-end message flows for the VoLTE sessions (step 104). More specifically, the characterization system determines whether any predefined condition is met (step 104A). For example, the predefined condition may be a condition where there is a missing neighbor relation for the eNB 18 or where there is an undefined QCI profile in the eNB 18. However, these are only examples of the condition. Any condition that is desirable to be monitored for and addressed may be predefined. If no predefined condition is met, the characterization system waits for the next predefined time period to end (step 104C) and then returns to step 102A to repeat the process for the next predefined time period. However, if a predefined condition is met, the characterization system changes one or more configurations for an appropriate node(s) based on a corresponding, predefined rule for the predefined condition (step 104B). For example, if the predefined condition is a missing neighbor relation, then a predefined rule may be that the missing neighbor relation is to be added to the appropriate eNB 18 in response to detecting the missing neighbor relation condition. Thus, in this case, the characterization system would add the missing neighbor relation to the appropriate eNB 18. The characterization system then waits for the next predefined time period to end (step 104C) and then returns to step 102A to repeat the process for the next predefined time period.

Figure 4:
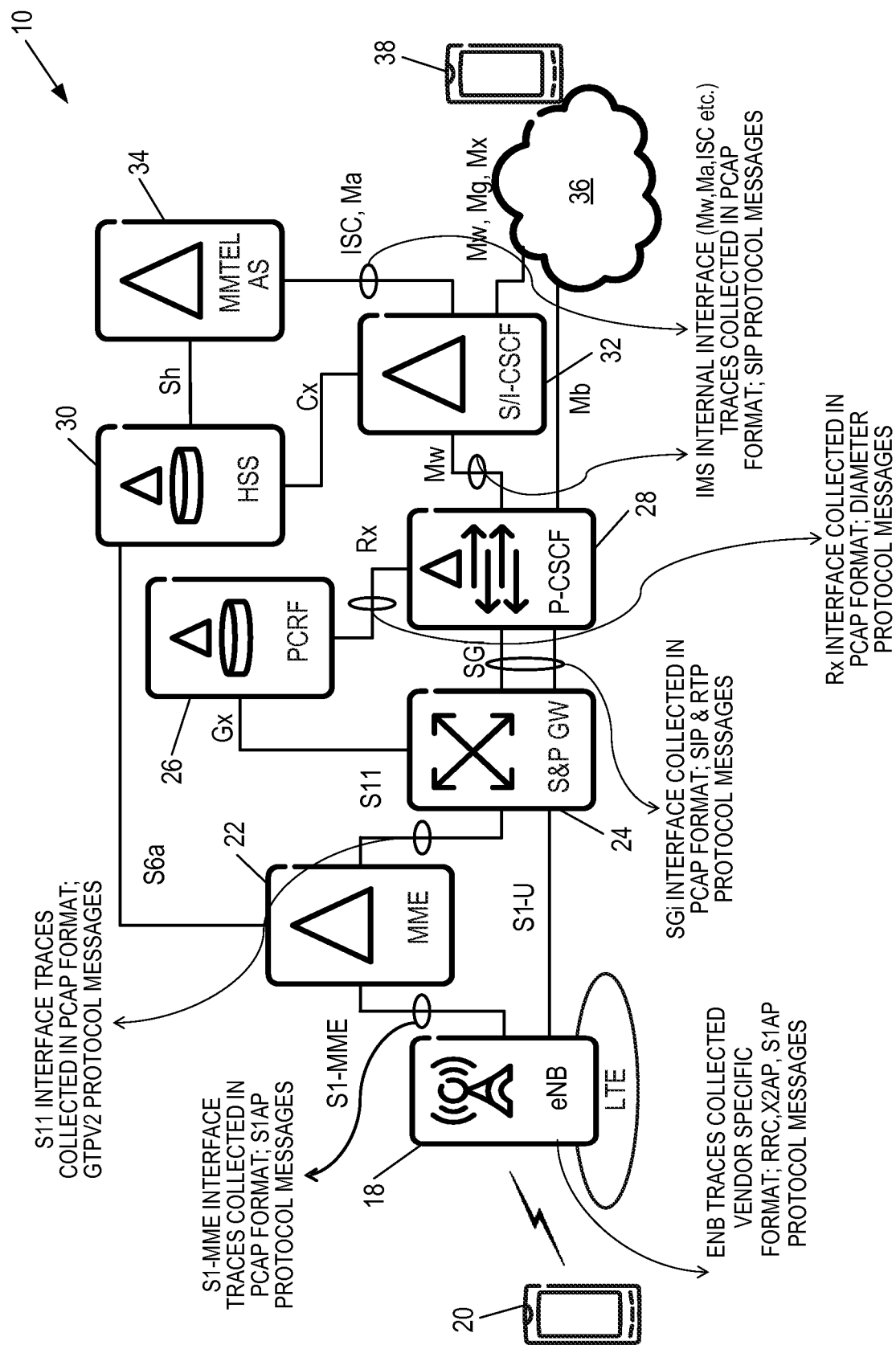
FIG. 4 illustrates the collection of traces from various nodes and interfaces in the system of FIG. 1 according to some embodiments of the present disclosure.

FIGS. 4 through 12 graphically illustrate the collection of traces and the correlation of the messages included in the traces for a VoLTE session according to some example embodiments of the present disclosure. In particular, FIG. 4 illustrates the collection of traces from various nodes and interfaces in the system 10 of FIG. 1. Note that FIG. 4 is only an example. Additional or alternative traces may be collected. As discussed above, the traces may be collected by one or more collection agent(s), which may be implemented on any node(s) in the system 10 or by a node(s) that is external to the system 10. In the illustrated example, the following traces are collected:

- eNB traces: Traces are collected from the eNB 18 in a vendor specific format. These traces include, for example, RRC protocol messages, X2AP protocol messages, and S1AP protocol messages.
- S1-MME traces: Traces are collected from the S1-MME interface in Packet Capture (PCAP) format and include S1AP protocol messages.
- S11 traces: Traces are also collected from the S11 interface in the PCAP format and include, in this example, GPRS Tunneling Protocol Version 2 (GTPv2) protocol messages.
- SGi traces: Traces are collected from the SGi interface in the PCAP format and include SIP and Real-Time Transfer Protocol (RTP) messages.
- Rx traces: Traces are collected from the Rx interface in the PCAP format and include DIAMETER protocol messages.
- IMS internal traces: Traces are collected from IMS internal interfaces (e.g., Mw, ISC, Ma, etc.) in the PCAP format and include SIP messages.

Note that, in the field of computer network administration, PCAP consists of an Application Programming Interface (API) for capturing network traffic. Unix-like systems implement PCAP in the libpcap library; Windows uses a port of libpcap known as WinPcap. Monitoring software may use libpcap and/or WinPcap to capture packets travelling over a network and, in newer versions, to transmit packets on a network at the link layer, as well as to get a list of network interfaces for possible use with libpcap or WinPcap. PCAP is packet capture in a specific format and captured files saved with *.pcap extension.

Figure 5:
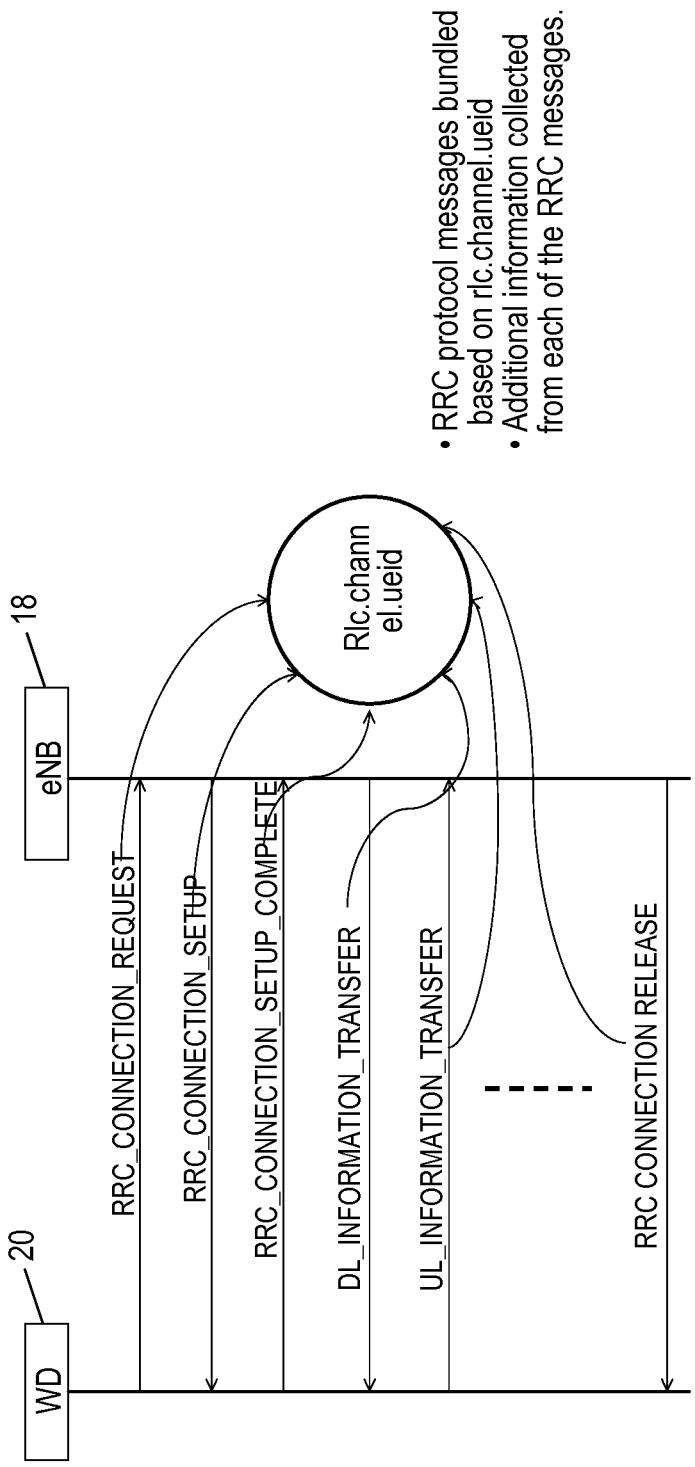
FIG. 5 illustrates bundling of Radio Resource Control (RRC) protocol messages for a VoLTE session according to some embodiments of the present disclosure.

FIGS. 5 through 11 graphically illustrate correlation, or bundling, of the messages from the traces collected in FIG. 4 for each protocol for each VoLTE session according to some example embodiments of the present disclosure. More specifically, FIG. 5 illustrates bundling of RRC protocol messages for a VoLTE session according to some embodiments of the present disclosure. As illustrated, during a VoLTE session, various RRC protocol messages are passed between the wireless device 20 and the eNB 18. These RRC protocol messages include, for example, an RRC Connection Request message, an RRC Connection Setup message, an RRC Connection Setup Complete message, and an RRC Connection Release message. As illustrated, for a particular VoLTE session, each of these RRC protocol messages will have the same Radio Link Control (RLC) Channel UE Identifier (ID) (Rlc.channel.ueid). The RLC Channel UE ID is an identifier of the wireless device 20 (e.g., UE) for purposes of identifying the wireless device 20 on the RLC layer. Since RRC protocol messages for the same VoLTE session will include the same RLC Channel UE ID, the RRC protocol messages are bundled, or correlated, according to the RLC Channel UE ID, where each bundle then corresponds to a different VoLTE session.

Figure 6:
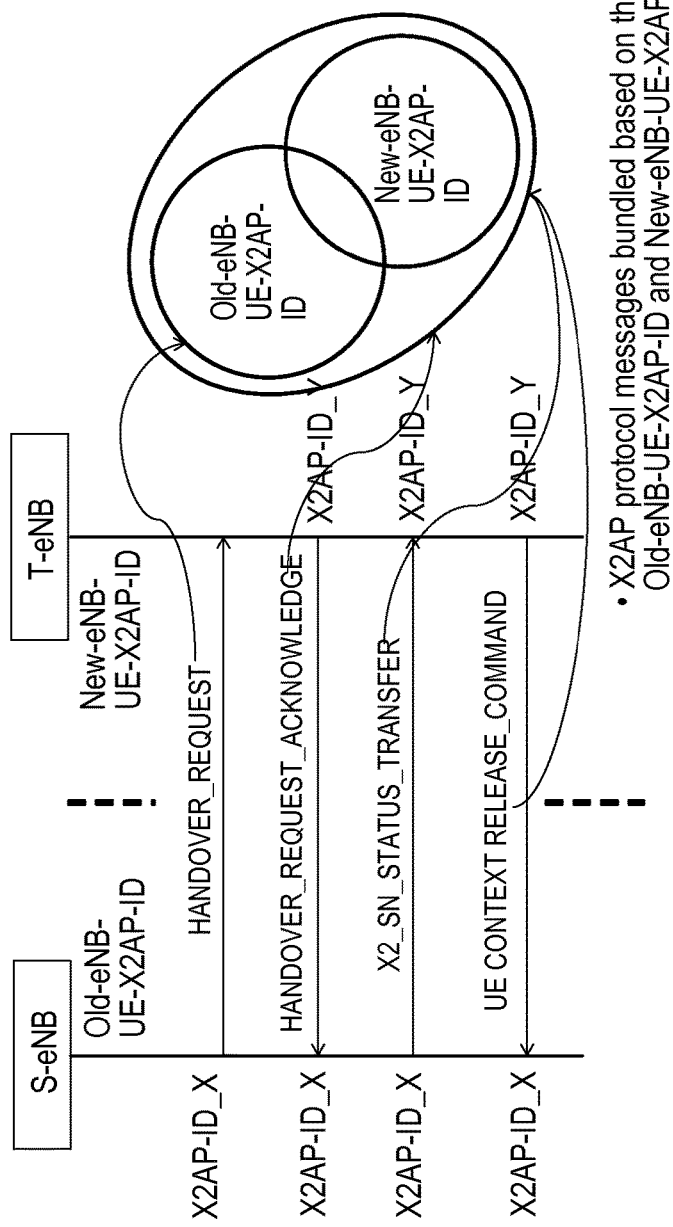
FIG. 6 illustrates bundling of X2AP messages for a VoLTE session according to some embodiments of the present disclosure.

FIG. 6 illustrates bundling of X2AP messages for a VoLTE session according to some embodiments of the present disclosure. As illustrated, for a handover of the wireless device 20 from a serving eNB (S-eNB), which may be the eNB 18, to a target eNB (T-eNB) during a VoLTE session, various X2AP protocol messages are passed between the S-eNB and the T-eNB. These X2AP protocol messages include, for example, a handover request message, a handover request acknowledge message, an X2 Sequence Number (SN) status transfer message, and a UE context release command message. As illustrated, the X2AP messages for a particular VoLTE session are bundled based on a unique pair of: (a) an identifier that uniquely identifies the wireless device 20 (UE) over the X2 interface with the S-eNB (Old-eNB-UE-X2AP-ID) and (b) an identifier that uniquely identifies the wireless device 20 (UE) over the X2 interface with the T-eNB (New-eNB-UE-X2AP-ID). The handover request message includes Old-eNB-UE-X2AP-ID, and the other X2AP messages include both Old-eNB-UE-X2AP-ID and New-eNB-UE-X2AP-ID. Therefore, by bundling the X2AP protocol messages according to these identifiers, the X2AP protocol messages are bundled according to VoLTE session.

Figure 7A:
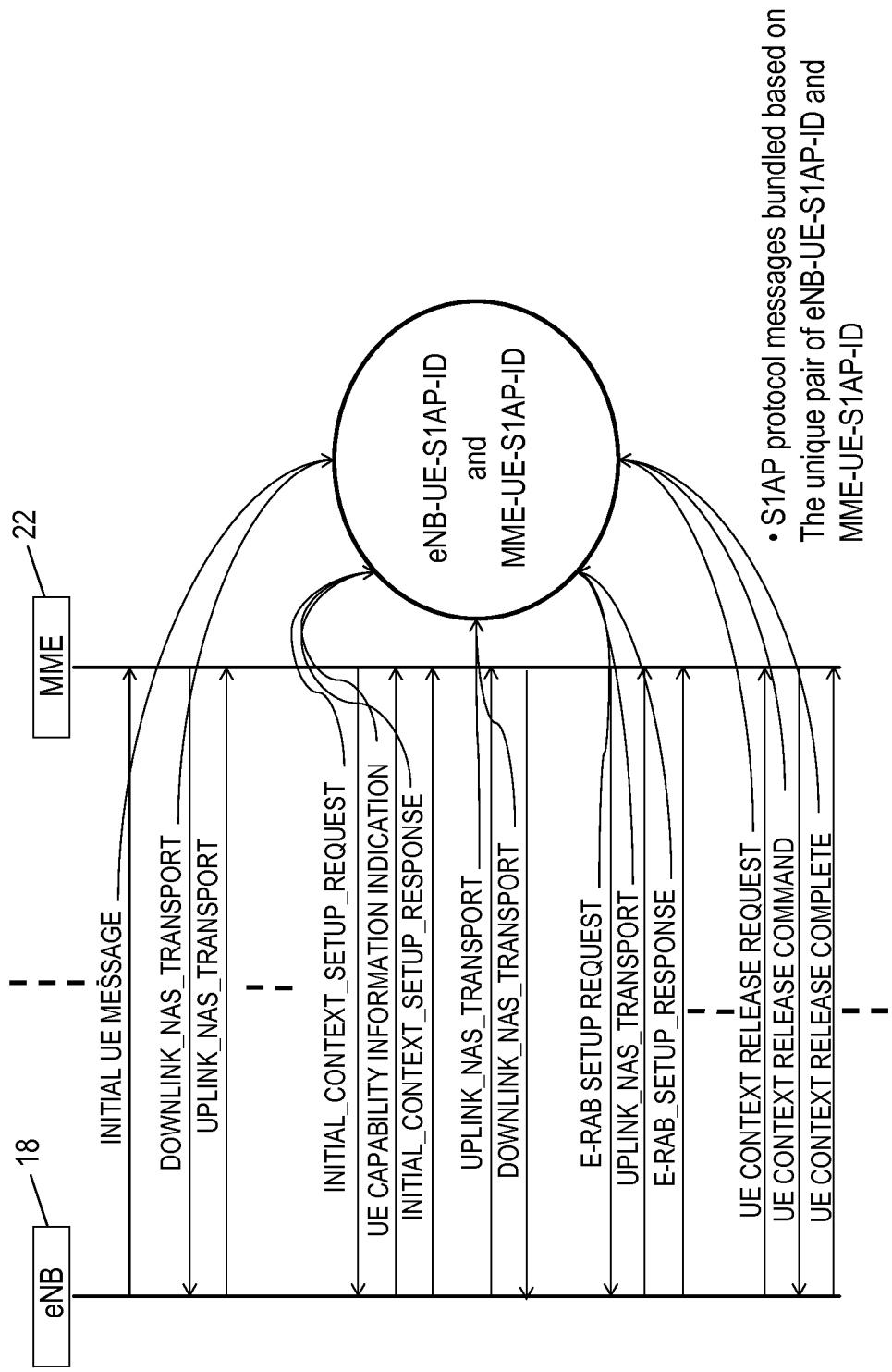

FIGS. 7A and 7B illustrate bundling of S1AP messages for a VoLTE session according to some embodiments of the present disclosure. As illustrated, for a VoLTE session, various S1AP protocol messages are passed between the eNB 18 and the MME 22. These S1AP protocol messages include, for example, an initial UE message, a downlink Non-Access Stratum (NAS) transport message, etc., as will be understood by those of ordinary skill in the art. As illustrated in FIG. 7B, each of the messages include an identifier of the wireless device 20 (UE) with respect to the S1AP interface and the eNB 18 (eNB-UE-S1AP-ID) and all of the messages except the initial UE message also include an identifier of the wireless device 20 (UE) with respect to the S1AP interface and the MME 22 (MME-UE-S1AP-ID). As such, the S1AP protocol messages are bundled according to the unique pair of eNB-UE-S1AP-ID and MME-UE-S1AP-ID. In this manner, S1AP messages for the same VoLTE session are bundled together into the same S1AP message bundle.

Figure 8A:
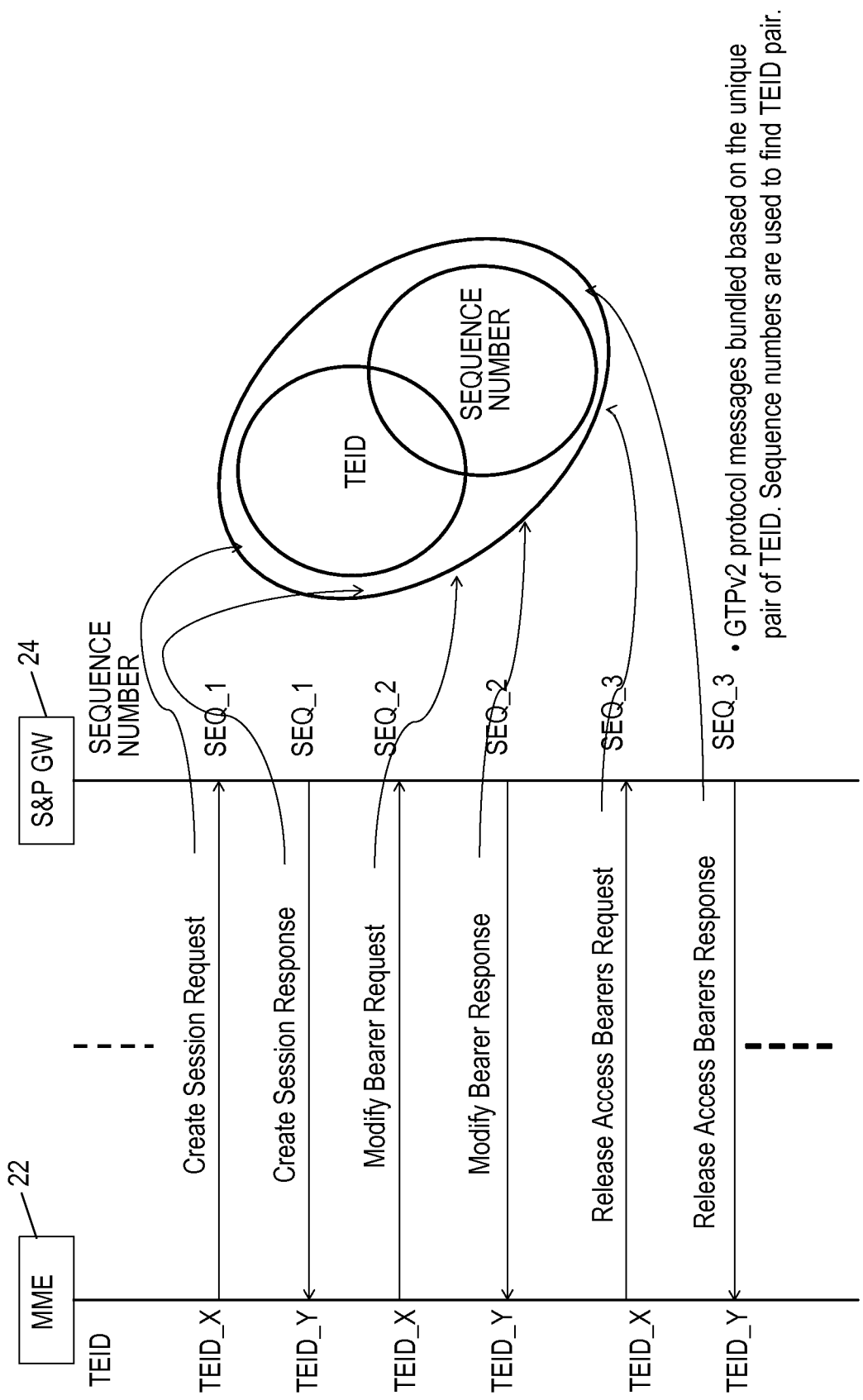

FIGS. 8A and 8B illustrate bundling of GTPv2 protocol messages for a VoLTE session according to some embodiments of the present disclosure. As illustrated, for a VoLTE session, various GTPv2 protocol messages are passed between the MME 22 and the S&P GW 24. These GTPv2 protocol messages include, for example, a create session request message, a create session response message, a modify bearer request message, a modify bearer response message, a release access bearers request message, and a release access bearers response message, as will be appreciated by one of ordinary skill in the art. As illustrated in FIG. 8B, each of these messages includes a Tunnel Endpoint Identifier (TEID). For a particular VoLTE session, the messages from the MME 22 to the S&P GW 24 will have one TEID (referred to in FIG. 8A as TEID_X), and the messages from the S&P GW 24 to the MME 22 will have another TEID (referred to in FIG. 8A as TEID_Y). The pair of TEIDs (TEID_X and TEID_Y) for a particular VoLTE session can be determined from SNs, which in FIG. 8A are referred to as SEQ_1, SEQ_2, and SEQ_3, included in the corresponding messages. The GTPv2-C message header contains the TEID and Sequence Number fields followed by one spare octet. The source and destination IP addresses and User Datagram Protocol (UDP) ports used for each GTP-Control Plane (GTP-C) message depend on the role that the message plays in a message exchange. A message can be an Initial message, or a Triggered message, or a Triggered Reply message to Triggered message. An Initial message is sent to a peer GTP entity with a SN chosen by the sending entity, as defined in 3GPP TS 29.274, Section 7.6. A Triggered message is sent in response to an Initial message. A Triggered Reply message may be sent in response to a Triggered message. The general format of the GTP header is defined in 3GPP TS 29.274, Section 5.1.

As illustrated in FIGS. 8A and 8B, the TEID pair for the VoLTE session can be identified based on any one of the following pairs of REQUEST and RESPONSE messages: (a) Create Session Request and Create Session Response, (b) Modify Bearer Request and Modify Bearer Response, and (c) Release Access Bearers Request and Release Access Bearers Response. Requests are sent from the MME to the S&P GW, and responses are sent in the reverse direction. For each pair of messages, SN is the same but TEID is different. For example, in FIG. 8A, three pairs of events can be inspected to lead to an identification of one pair of TEID, which are TEID_X and TEID_Y. For identification of TEID pair, however, any single pair of messages can be used. In this manner, GTPv2 protocol messages can be bundled for each VoLTE session.

Figure 9:
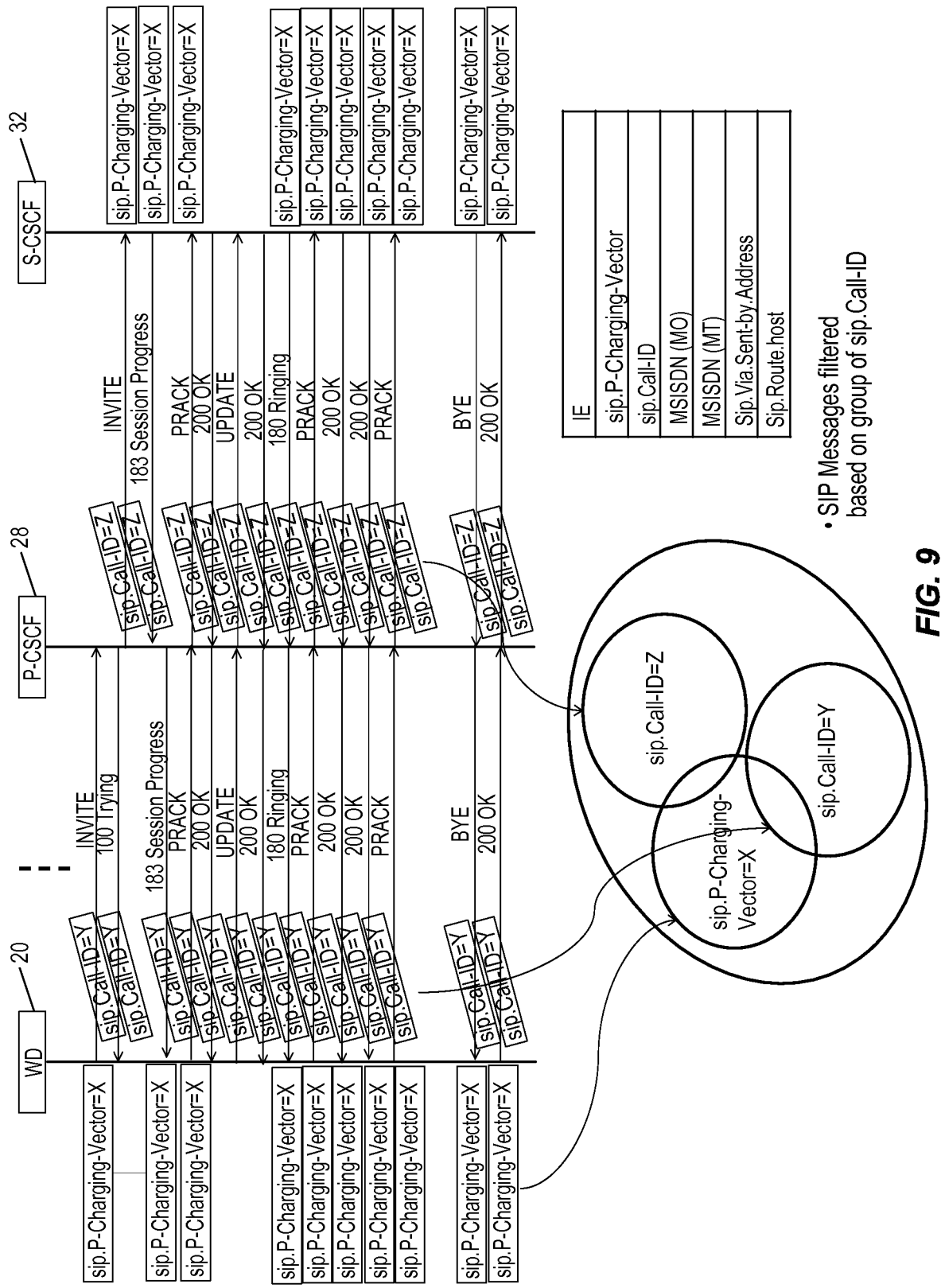
FIG. 9 illustrates bundling of Session Initiation Protocol (SIP) messages for a VoLTE session according to some embodiments of the present disclosure.

FIG. 9 illustrates bundling of SIP protocol messages for a VoLTE session according to some embodiments of the present disclosure. As illustrated, for a VoLTE session, various SIP protocol messages are passed between the wireless device 20 and the P-CSCF 28 and between the P-CSCF 28 and the S-CSCF 32, as will be appreciated by one of ordinary skill in the art. Using a combination of sip.P-Charging-Vector and sip.Call-ID, the SIP protocol messages for the VoLTE session are bundled.

For example, the SIP messages having the information element sip.P-Charging-Vector (not present in all the SIP messages) are filtered in. For these SIP messages, the distinct combination of sip.P-Charging-Vector and sip.Call-ID (present in all SIP messages) is found. Assume that there is the following combination:

sip.P-Charging-Vector sip.Call-ID
sip.P-Charging-Vector=X sip.Call-ID=Y
sip.P-Charging-Vector=X sip.Call-ID=Z
sip.P-Charging-Vector=A sip.Call-ID=B
sip.P-Charging-Vector=A sip.Call-ID=C
sip.P-Charging-Vector=A sip.Call-ID=D
sip.P-Charging-Vector=E sip.Call-ID=F
sip.P-Charging-Vector=E sip.Call-ID=G Then for each distinct value of sip.P-Charging-Vector, a list of sip.Call-ID is obtained. In this example, for sip.P-Charging-Vector=X, there are two sip.Call-ID-sip.Call-ID=Y and sip.Call-ID=Z. At this point, all the SIP messages having either sip.Call-ID=Y or sip.Call-ID=Z are bundled as one VoLTE session. This process is repeated for each distinct sip.P-Charging-Vector.

Figure 10:
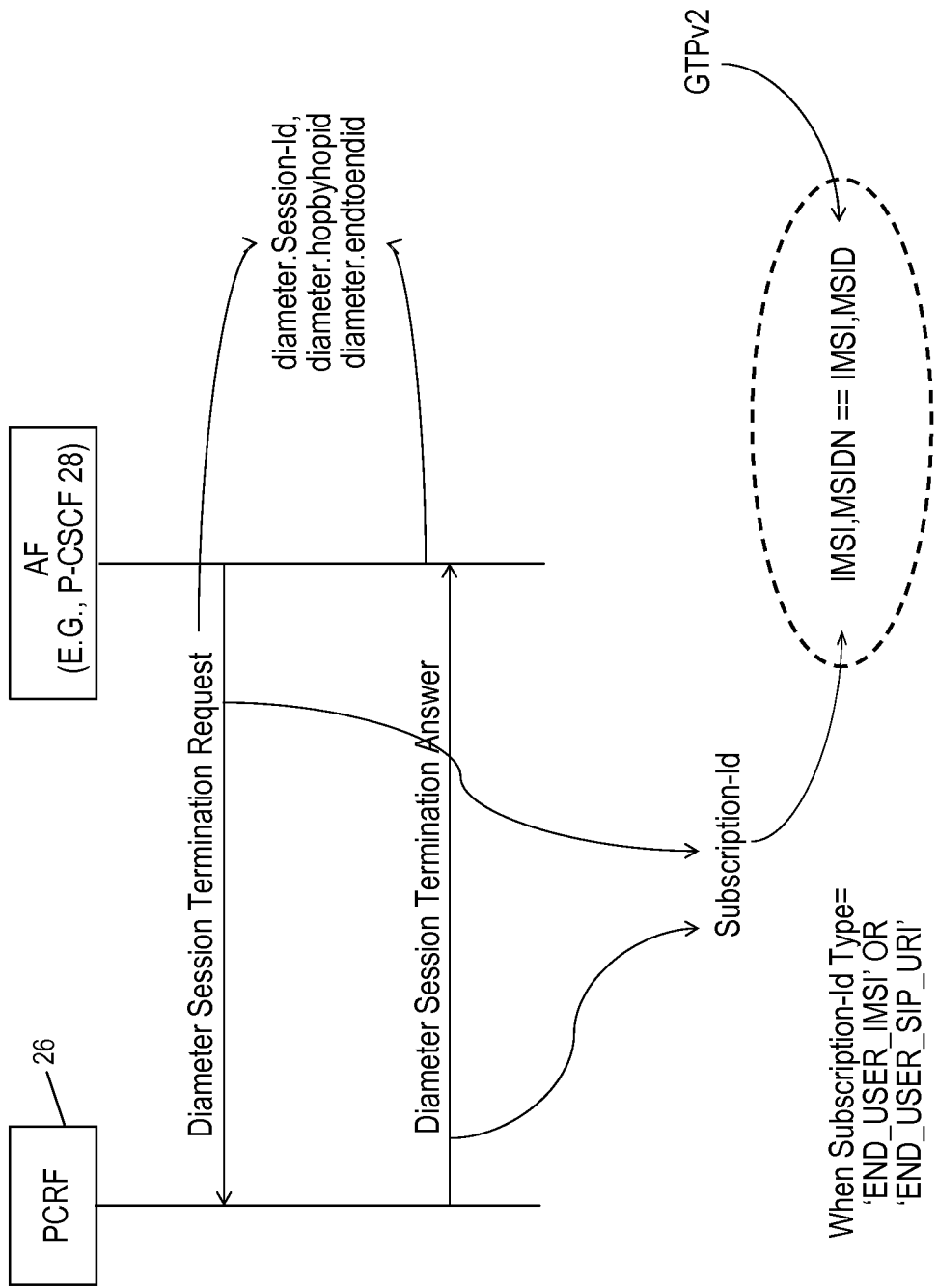
FIG. 10 illustrates bundling of DIAMETER protocol messages for a VoLTE session according to some embodiments of the present disclosure.

FIG. 10 illustrates bundling of DIAMETER protocol messages between the PCRF 26 and an Application Function (AF) (e.g., the P-CSCF 28) via the Rx interface according to some embodiments of the present disclosure. As illustrated, for a VoLTE session, various DIAMETER protocol messages are exchanged between the PCRF 26 and the AF. DIAMETER protocol messages are bundled according to diameter.Session-Id, diameter.hopbyhopid, and diameter.endtoendid. To correlate the DIAMETER messages with GTPv2 protocol messages, Subscription-Id is used. In DIAMETER messages, when Subscription-Id-Type='END_USER_IMSI' OR 'END_USER_SIP_URI', then value of Subscription-Id is International Mobile Subscriber Identity (IMSI) or MSISDN, respectively. IMSI and MSISDN information is available in GTPv2 protocol messages and thus can be correlated.

Figure 11:
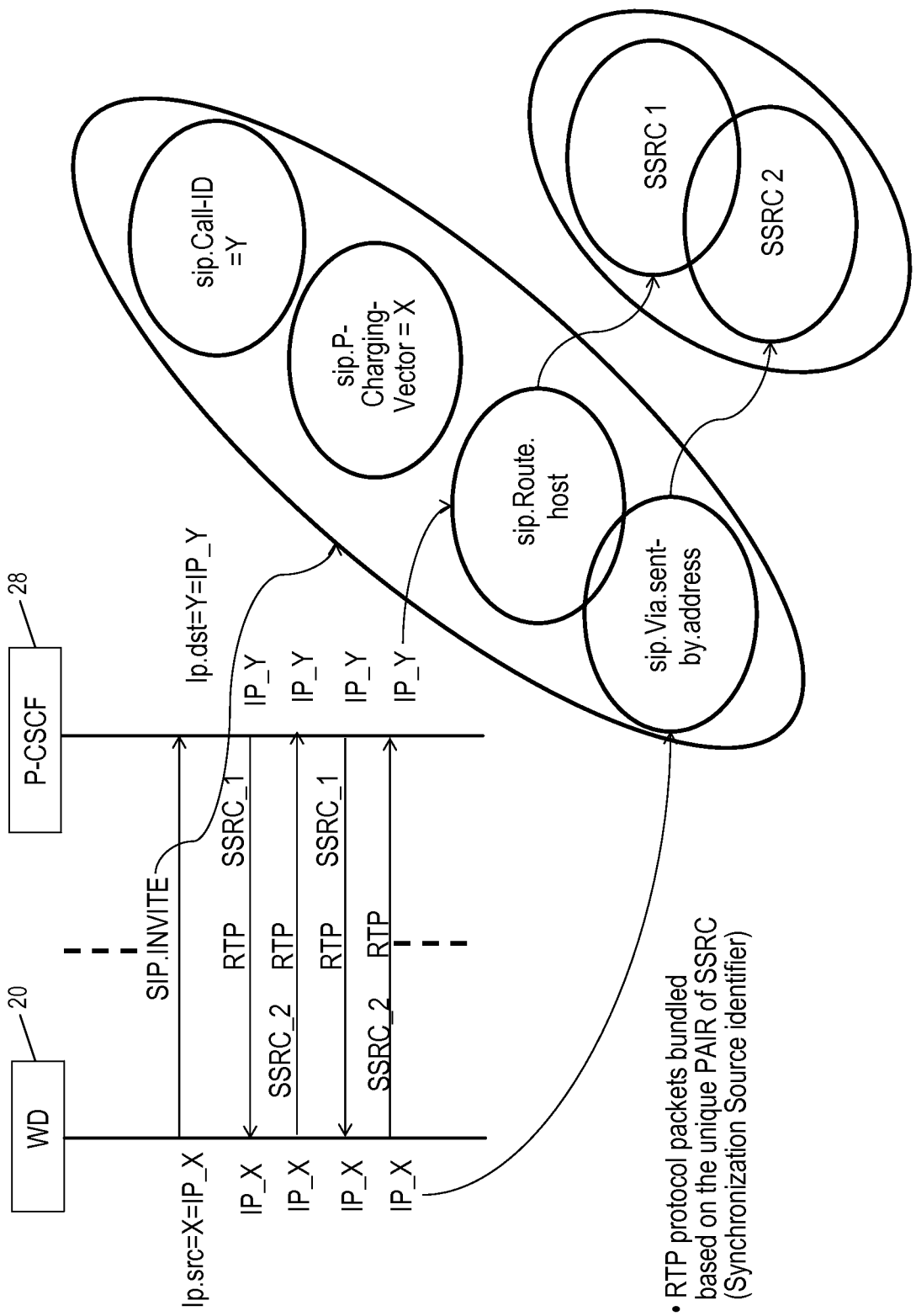
FIG. 11 illustrates bundling of Real-Time Transfer Protocol (RTP) messages for a VoLTE session according to some embodiments of the present disclosure.

FIG. 11 illustrates bundling of RTP messages for a VoLTE session according to some embodiments of the present disclosure. As illustrated, for a VoLTE session, various RTP messages are passed between the wireless device 20 and the P-CSCF 28. The RTP messages are bundled based on a unique pair of Synchronization Sources (SSRCs). Here, in this example, the unique pair of SSRCs is the pair SSRC 1 and SSRC 2.

SIP INVITE Message will include sip.Route.host and sip.Via.sent-by.address. These two information elements from SIP INVITE message will form a pair of IPs (SOURCE and DESTINATION). RTP messages will include SSRC, IP Source, and IP Destination. We need to filter in RTP messages having source and destination IP pair same as the pair of IPs available from SIP INVITE message. Mathematically, we can apply following condition while filtering RTP messages:

```
IF
[
(IP_X= sip.Route.host AND IP_Y= sip.Via.sent-by.address)
OR
(IP_Y= sip.Route.host AND IP_X= sip.Via.sent-by.address)
]
THEN
{
EXTARCT SSRC PAIR FROM THE RTP MESSAGES.
}
```

For one session, for example, one SSRC (SSRC_1) will be used from UE to P-CSCF; the other SSRC (SSRC_2) will be used in the reverse direction—P-CSCF to UE. For one session, SSRCs will not be reversed. However, the same pair of SSRCs can be used for another session. But the pair of IPs (sip.Route.host and sip.Via.sent-by.address) will be different in that case. So, the combination of the pair of IPs (sip.Route.host and sip.Via.sent-by.address) and the pair of SSRCs (SSRC_1, SSRC_2) will be unique. Using these unique pairs, RTP messages for a VoLTE session can be bundled.

Figure 12:
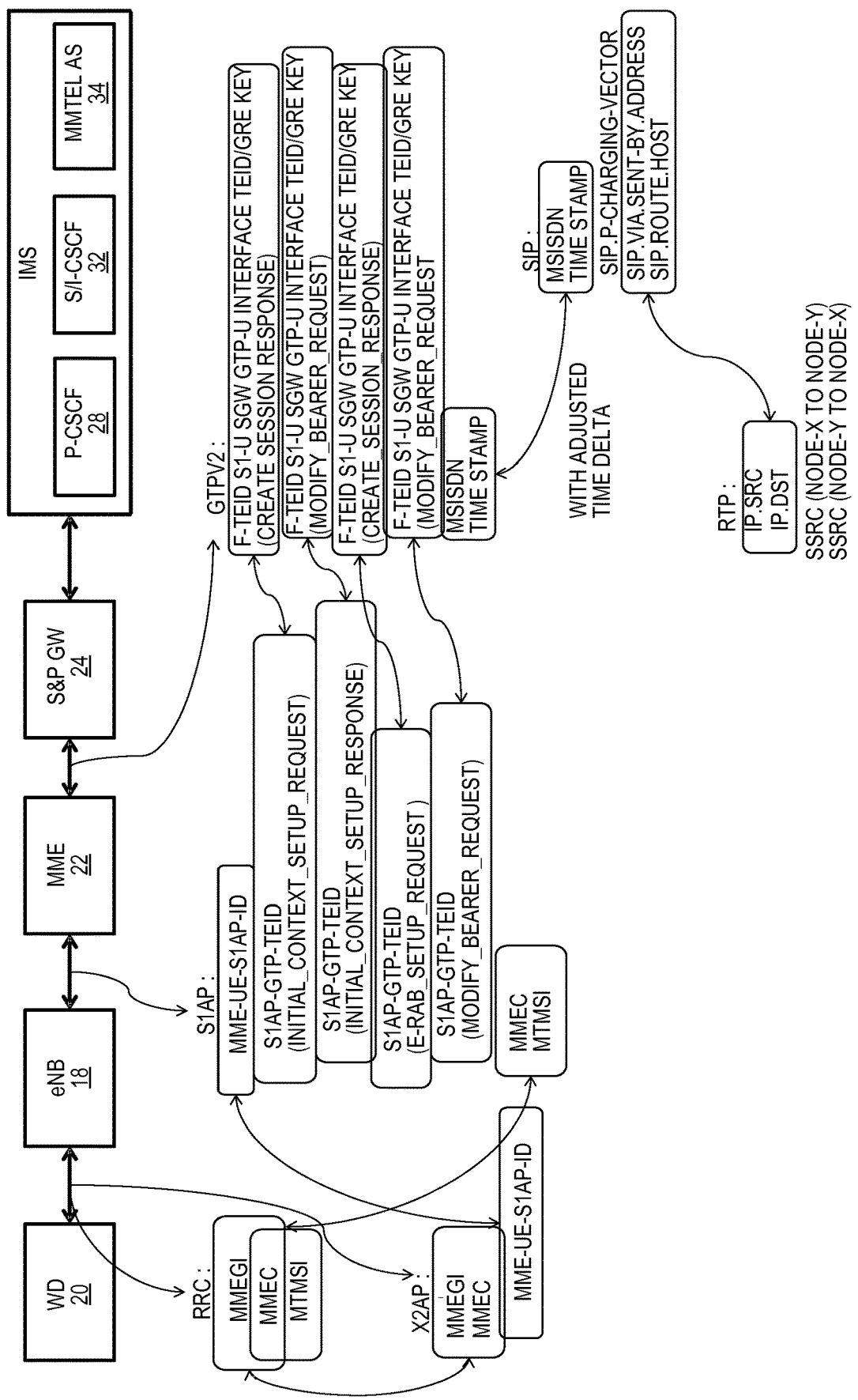
FIG. 12 illustrates the correlation of messages for a VoLTE session across multiple protocols according to some embodiments of the present disclosure.

While FIGS. 5 through 11 illustrate the bundling of messages within each specific protocol, FIG. 12 illustrates the correlation of the messages across protocols. For instance, in some embodiments, once the messages for a VoLTE session are bundled within each protocol to create corresponding bundles of messages for the different protocols, the bundles of messages are then correlated across the different protocols to create the end-to-end message flow for the VoLTE session. In this example, as illustrated in FIG. 12, the bundle of RRC protocol messages for the VoLTE session is, or at least can be, correlated with the bundle of X2AP protocol messages for the same VoLTE session via MME Group Identity (MMEGI) and MME Code (MMEC). Similarly, the bundle of RRC protocol messages for the VoLTE session is, or at least can be, correlated with the bundle of S1AP protocol messages for the same VoLTE session via MMEC and MME Temporary Mobile Subscriber Identity (M-TMSI). The bundle of X2AP protocol messages for the VoLTE session is correlated with the bundle of S1AP protocol messages for the same VoLTE session via MME-UE-S1AP-ID.

The bundle of S1AP protocol messages is correlated to the bundle of GTPv2 protocol messages via:

Correlation S1AP-GTP-TEID (from an initial context setup request message) and a Fully Qualified TEID (F-TEID) S1-U S-GW General Packet Radio Service Tunneling Protocol-User Plane (GTP-U) Interface TEID/Generic Routing Encapsulation (GRE) Key (from a create session response message), which will have the same value for the same VoLTE session. Notably, S1AP-GTP-TEID is the GTP Tunnel Endpoint Identifier used for user plane transport between the eNB and the serving gateway (as defined in 3GPP TS 36.413, Section 9.2.2.2), and F-TEID S1-U S-GW GTP-U Interface TEID/GRE Key is a Fully Qualified Tunnel Endpoint Identifier as defined in 3GPP TS 29.274, Section 8.22 and Table 7.2.2-2. The F-TEID S1-U S-GW GTP-U Interface TEID/GRE Key information element is sent on the S11 interface if the S1-U interface is used. This information element is included in the response sent from the S-GW selected by the source MME for indirect data forwarding to the source MME. If available, this information element may also be included in the response sent during the intra-E-UTRAN handover from the S-GW selected by the source MME for indirect data forwarding to the source MME;

Correlation of S1AP-GTP-TEID (from an initial context setup response) and a F-TEID S1-U S-GW GTP-U Interface TEID/GRE Key (from a modify bearer request), which will have the same value for the same VoLTE session;

Correlation of S1AP-GTP-TEID (from an E-RAB Setup Request message) and a F-TEID S1-U S-GW GTP-U Interface TEID/GRE Key (from a Create Session Response message), which will have the same value for the same VoLTE session; and/or Correlation of S1AP-GTP-TEID (from a Modify Bearer Request message) and a F-TEID S1-U S-GW GTP-U Interface TEID/GRE Key (from a modify bearer request), which will have the same value for the same VoLTE session.

The bundle of GTPv2 protocol messages is correlated to the bundle of SIP messages via Mobile Subscriber Integrated Services Digital Network Number (MSISDN) and time stamp (including an adjusted time delta to account for, e.g., different time zones). The bundle of SIP messages is correlated to the bundle of RTP messages via the source and destination addresses (IP.SRC and IP.DST) of the RTP messages and the SIP via sent by address (SIP.VIA.SENT-BY.ADDRESS) and SIP route host (SIP.ROUTE-HOST) of the SIP messages.

Note that not all of the correlations illustrated in FIG. 12 may be needed to create the end-to-end message flow for the VoLTE session. For instance, once the RRC message bundle is correlated to both the X2AP message bundle and the S1AP message bundle, then there may be no need to further correlate the X2AP message bundle and the S1AP message bundle since they are already correlated via the RRC message bundle.

Figure 13:
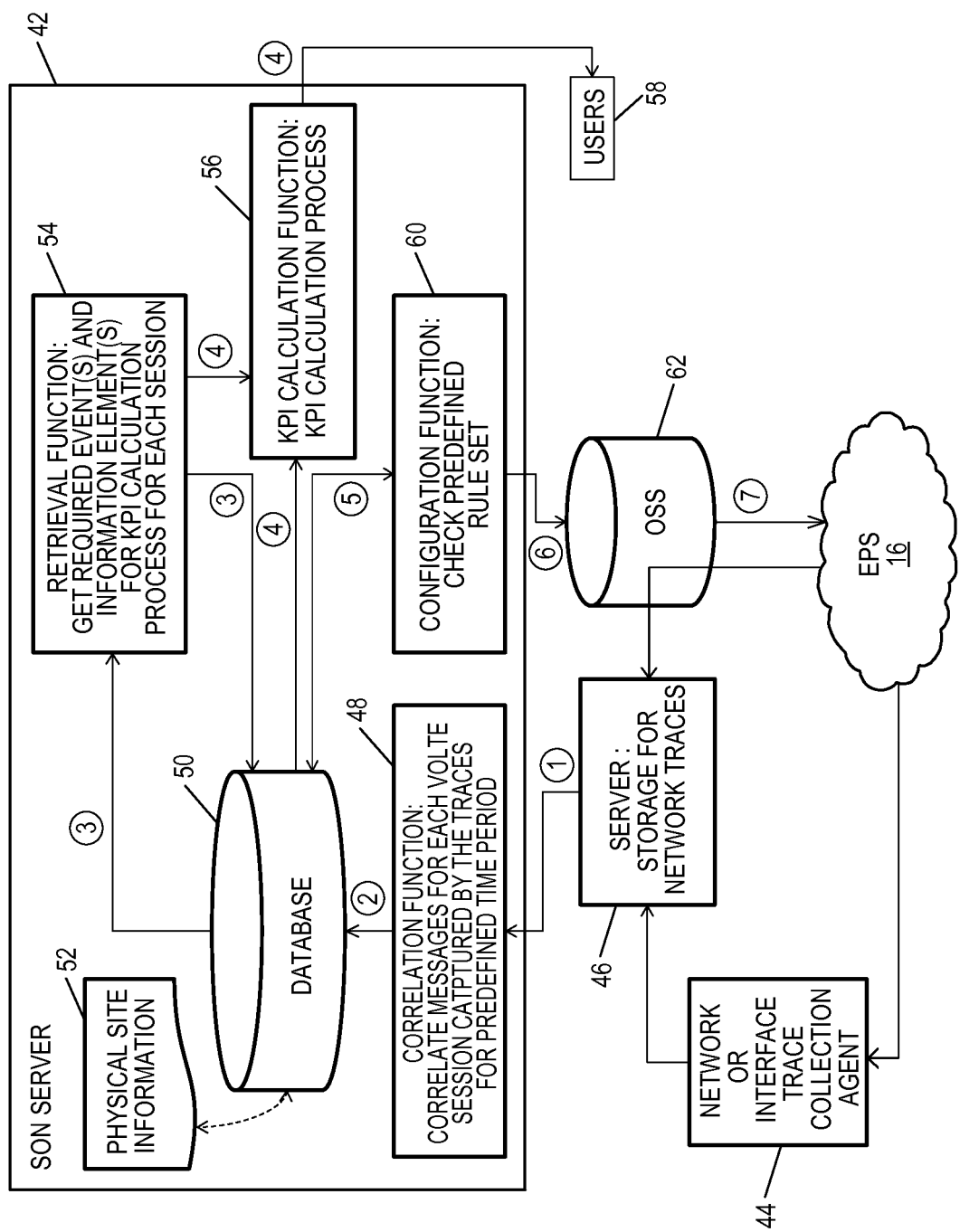
FIG. 13 illustrates a Self-Organizing Network (SON) server that operates to correlate messages to provide end-to-end message flows for VoLTE sessions and, in some embodiments, provide automated network configuration based on the end-to-end message flows for the VoLTE sessions according to some embodiments of the present disclosure.

FIG. 13 illustrates an embodiment in which a SON server 42 operates to correlate messages to provide end-to-end message flows for VoLTE sessions and, in some embodiments, provide automated network configuration based on the end-to-end message flows for the VoLTE sessions. As illustrated, a network or interface trace collection agent 44 operates to collect traces, or logs, from the nodes and interfaces in the EPS 16. The collected traces are stored by a server 46. The SON server 42 includes a correlation function 48 that operates to obtain the traces from the server 46 and correlates the messages for each VoLTE session captured by the traces for a predefined time period. The correlation function 48 stores the resulting data in a database 50. This resulting data is referred to herein as data that is representative of the end-to-end message flows of the VoLTE sessions. In some embodiments, the data for a VoLTE session is or includes the messages that have been correlated for that VoLTE session. Notably, physical site information 52 may also be stored in the database 50. The physical site information 52 may include, for example, the geographic locations of some or all of the nodes in the EPS 16 (e.g., the geographic location of the eNB 18).

A retrieval function 54 of the SON server 42 gets the event(s) and information (e.g., information elements) pertaining to the event(s) that are needed to calculate one or more Key Performance Indicators (KPIs) for the EPS 16, the LTE RAN (i.e., the E-UTRAN 12), or the EPC 14. A KPI calculation function 56 utilizes a KPI calculation process(es) to calculate the KPI(s) using the events and information retrieved by the retrieval function 54 and, in some embodiments, provides the KPI(s) to one or more users 58 for, e.g., analysis. Note that the functions 54 and 56 are optional and may not be included in all implementations.

The SON server 42 also includes a configuration function 60. The configuration function 60 processes data representative of the end-to-end message flows for the VoLTE sessions for the predefined time period using one or more predefined rule sets. Each rule set defines a condition and an action to be performed (i.e., a configuration to be made) in response to the condition. Some examples are described below. If a predefined condition is satisfied, then the configuration function 60 configures the appropriate node(s) of the EPS 16 by taking the defined action(s) (e.g., sending an appropriate command(s) to an OSS 62 for the EPS 16). In some embodiments, each VoLTE session is checked individually to determine whether any of the predefined conditions are satisfied for that VoLTE session and, if so, the corresponding action is taken. Note, however, that some predefined conditions/rules may consider multiple or all VoLTE sessions.

As discussed above, the SON server 42 includes a number of "functions" 48, 54, 56, and 60. These "functions" may be implemented in software, hardware, or a combination thereof. For example, in some embodiments, the functions 48, 54, 56, and 60 are implemented in software that is executed by one or more processors (e.g., Central Processing Units (CPUs), Application Specific Integrated Circuits (ASICs), Field-Programmable Gate Arrays (FPGAs), and/or the like) of the SON server 42. However, the functions are not limited to being implemented in software and may, in some embodiments, be implemented in hardware or a combination of hardware and software.

In order to support a SON for VoLTE service performance optimization, it is desirable to detect and correct for the following problems: (a) a requested QCI profile not being defined in a target eNB for a handover and (b) an RRC Reestablishment rejection due to a missing neighbor relation. FIGS. 14 through 17 relate to problem (a), while FIGS. 18 through 25 relate to problem (b).

In particular, FIGS. 14 and 15 relate to a process for detecting and correcting a condition where a requested QCI profile is not defined in a target eNB for a handover during a VoLTE session according to some embodiments of the present disclosure. In some embodiments, this process is performed by the configuration function 60 of FIG. 13 or as or as part of step 104 of FIG. 2 or FIG. 3. However, this process is not limited thereto. As illustrated in FIG. 14, for a handover to a target eNB, which in this example is the eNB 18, during a VoLTE session, the MME 22 sends an E-RAB setup request to the eNB 18, and the eNB 18 sends an E-RAB setup response to the MME 22. If E-RAB setup failed, the E-RAB setup response includes a cause value. Further, if the E-RAB setup failed because the requested QCI profile is not supported by the eNB 18, then the cause value will indicate this as the cause of the failure. As such, by examining the end-to-end message flow for the VoLTE session, the configuration function 60 is able to detect a condition where a requested QCI value is not defined in a target eNB.

More specifically, as illustrated in FIG. 15, the configuration function 60 gets the E-RAB Identifier (E-RAB-ID) and the QCI value from an E-RAB setup request in the end-to-end message flow for the VoLTE session (step 200). The configuration function 60 also gets the corresponding E-RAB setup response from the end-to-end message flow for the VoLTE session (step 202). The configuration function 60 determines whether the E-RAB setup was successful based on the E-RAB setup response (step 204). If successful, the process ends. However, if the E-RAB setup was not successful, the configuration function 60 determines whether the failure cause in the E-RAB setup response indicates that the failure is due to the requested QCI profile not being defined in the target eNB (i.e., failure cause=not supported QCI value) (step 206). If not, the process ends. If so, the configuration function 60 defines the QCI value in the target eNB (step 208). The parameter settings for each QCI profile can be obtained from a predefined list of values, which may be stored in, e.g., the database 50.

FIGS. 16 and 17 illustrate examples of the E-RAB setup request and the E-RAB setup response. As illustrated in FIG. 16, the E-RAB setup request includes the requested QCI. As illustrated in FIG. 17, the E-RAB setup response includes the failure cause.

Figure 18:
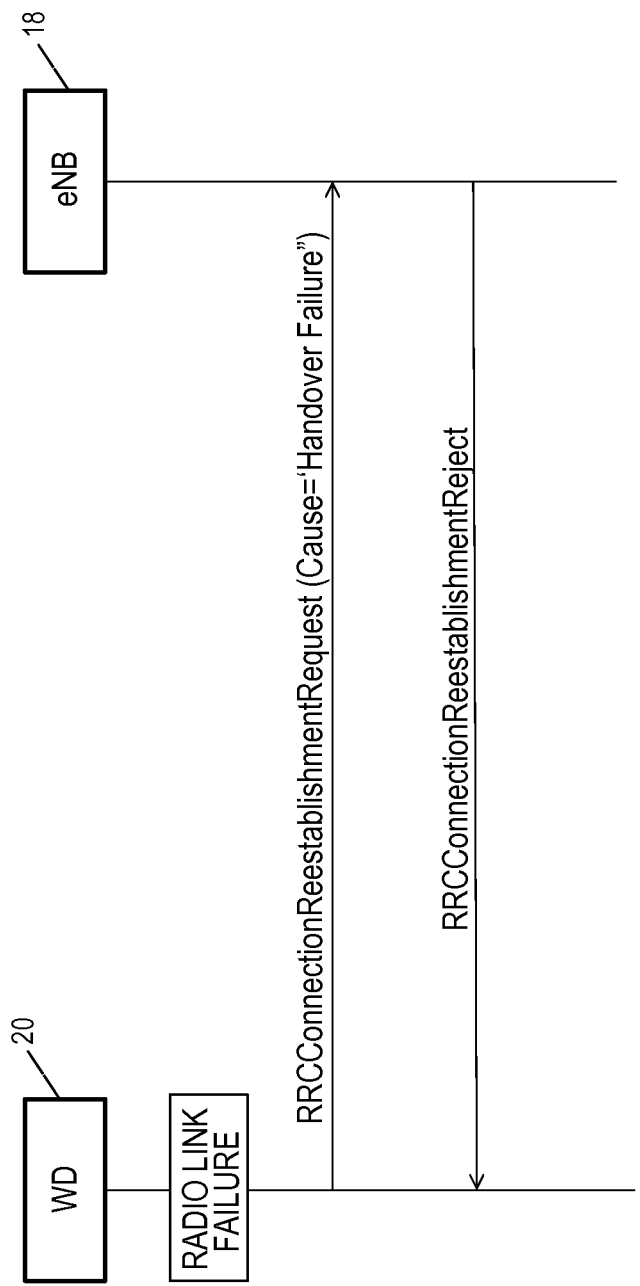

FIGS. 18 through 25 relate to a process for detecting and correcting a condition where there is an RRC Reestablishment rejection for a VoLTE session due to a missing neighbor relation according to some embodiments of the present disclosure. During handover, if the wireless device 20 encounters a radio link failure, the wireless device 20 tries RRC connection reestablishment by sending an RRC Connection Reestablishment Request message to a target eNB, which in this example is the eNB 18, as illustrated in FIG. 18. In this example, the RRC Connection Reestablishment Request is rejected by the eNB 18. If the cell on which reestablishment is attempted is different from the cell on which the wireless device 20 was connected prior to the radio link failure and both cells are not defined as neighbors of one another and the distance between the cells is less than a predefined threshold, then the configuration function 60 sends a command to the target eNB via the OSS 62 to define the cells as neighbors. Parameter settings for the relation to be used in the command can be obtained from a predefined list of values stored in, e.g., the database 50.

Figure 19:
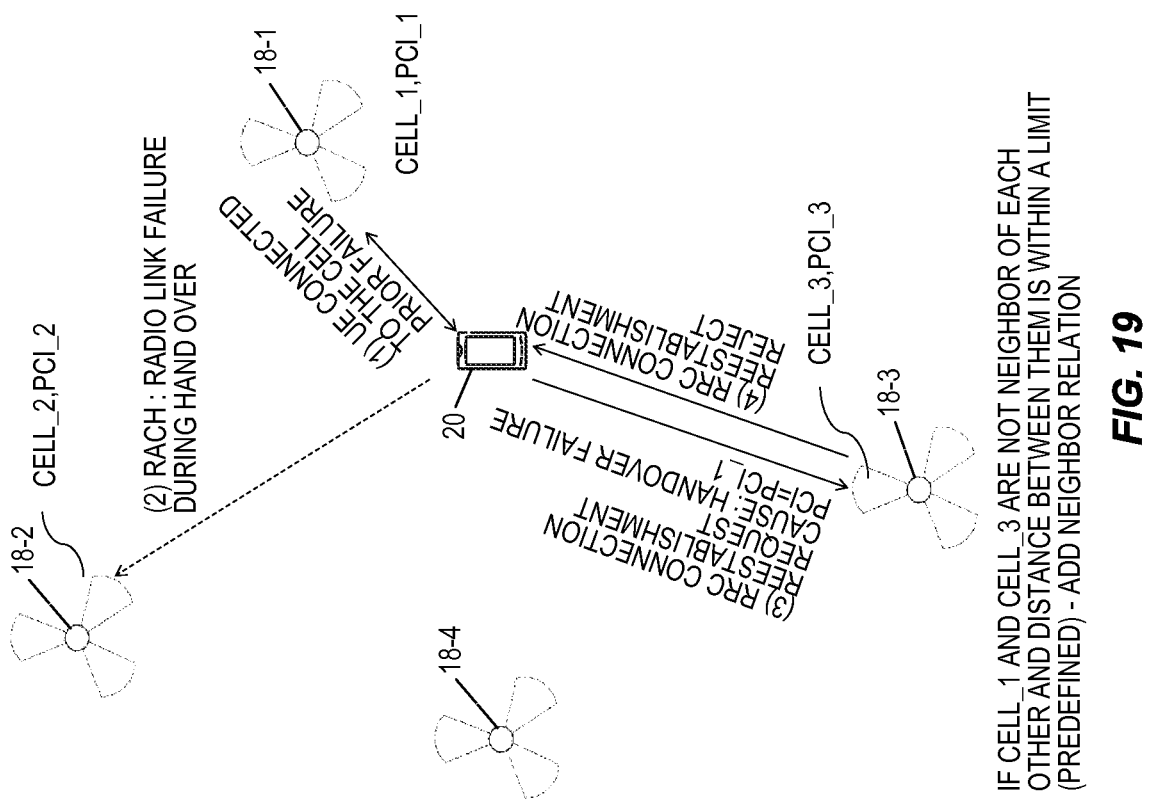

FIG. 19 graphically illustrates a condition where there is an RRC Reestablishment rejection for a VoLTE session due to a missing neighbor relation according to one particular example. As illustrated, the wireless device 20 (e.g., a UE) is connected to CELL_1 served by eNB 18-1 prior to a radio link failure. A radio link failure then occurs during handover of the wireless device 20 from CELL_1 to CELL_2, where CELL_2 is served by eNB 18-2. After the handover failure, the wireless device 20 sends an RRC Connection Reestablishment Request to a target eNB 18-3 serving CELL_3. The RRC Connection Reestablishment Request indicates the cause of the request as a handover failure. The target eNB 18-3 returns an RRC Connection Reestablishment Reject to the wireless device 20. In this example, the rejection occurred due to a missing neighbor relation between CELL_1 and CELL_2. As discussed below, by examining the end-to-end message flow for the VoLTE session, the configuration function 60 is able to detect and correct the missing neighbor relation.

Figure 20A:
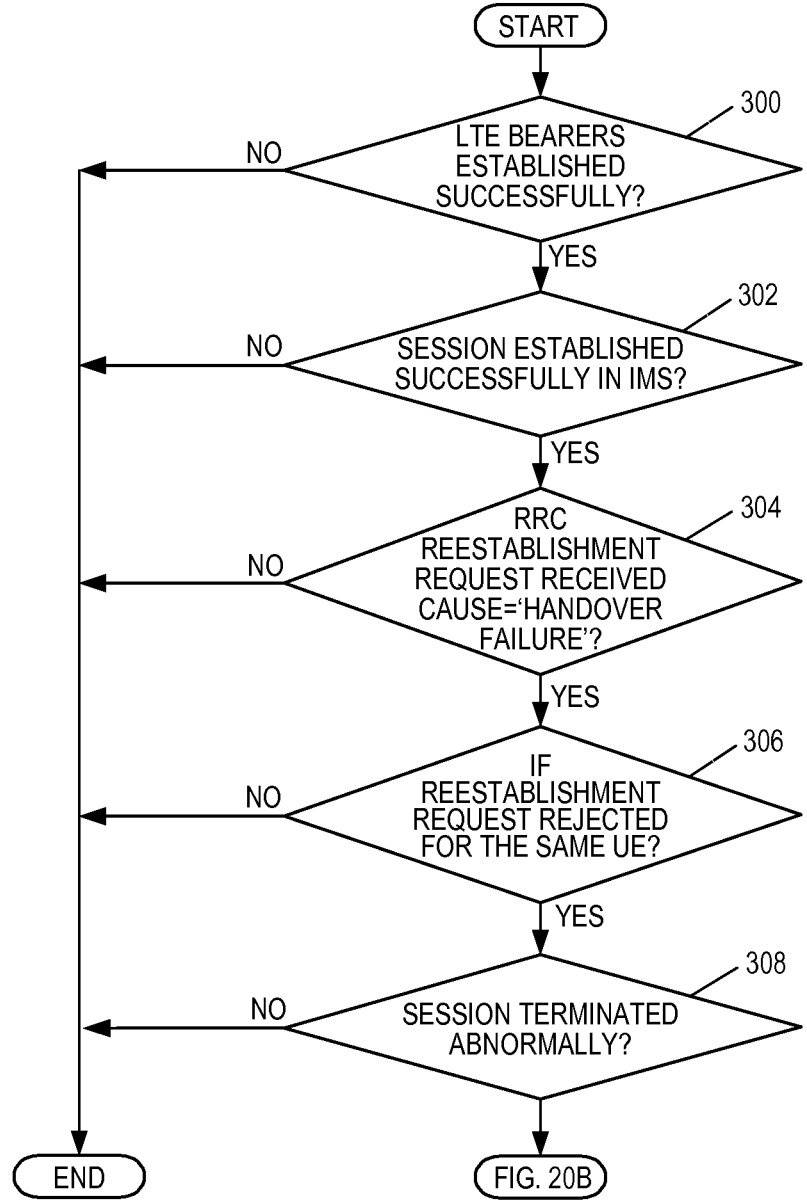
Figure 20B:
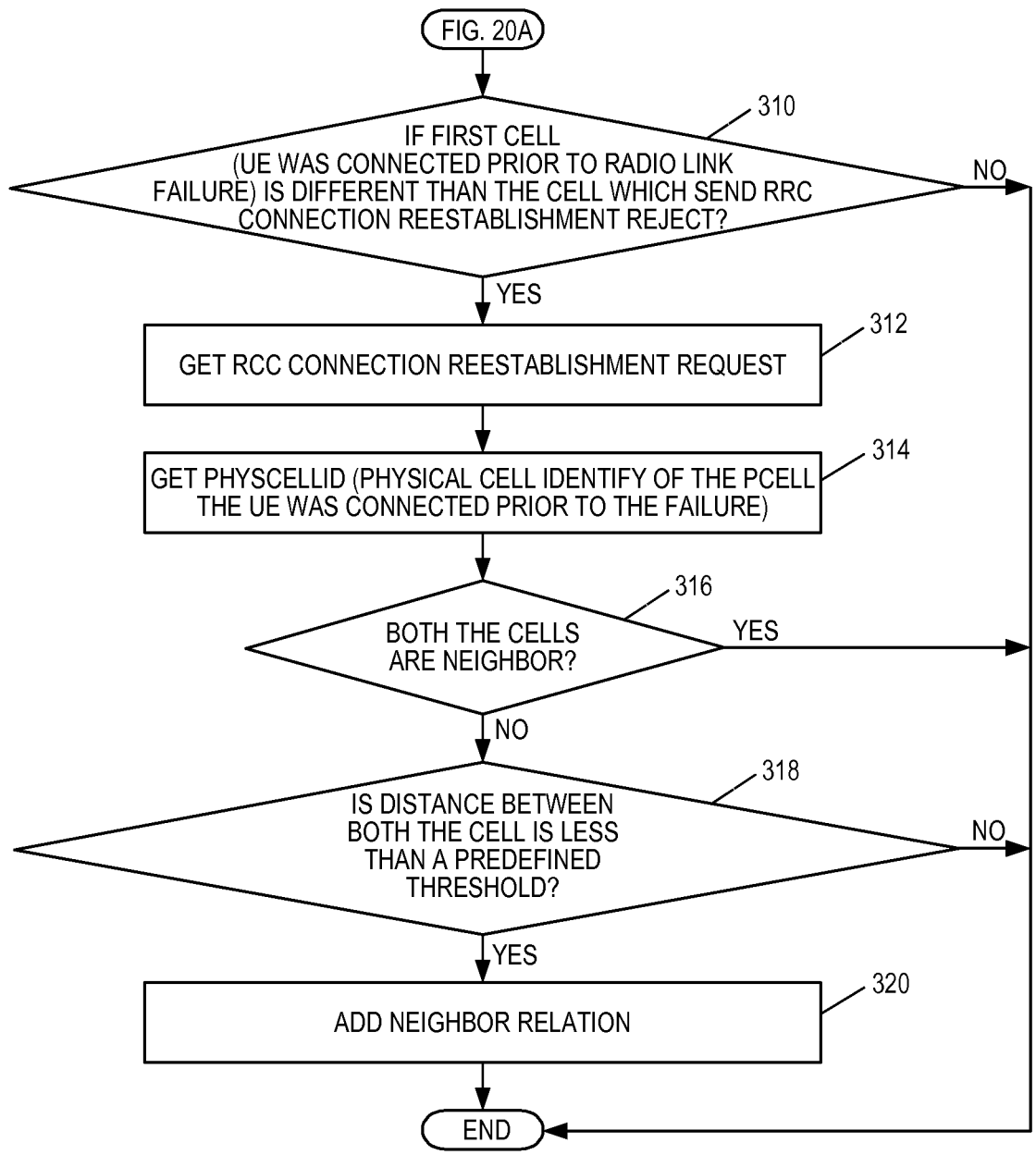
Figure 21A:
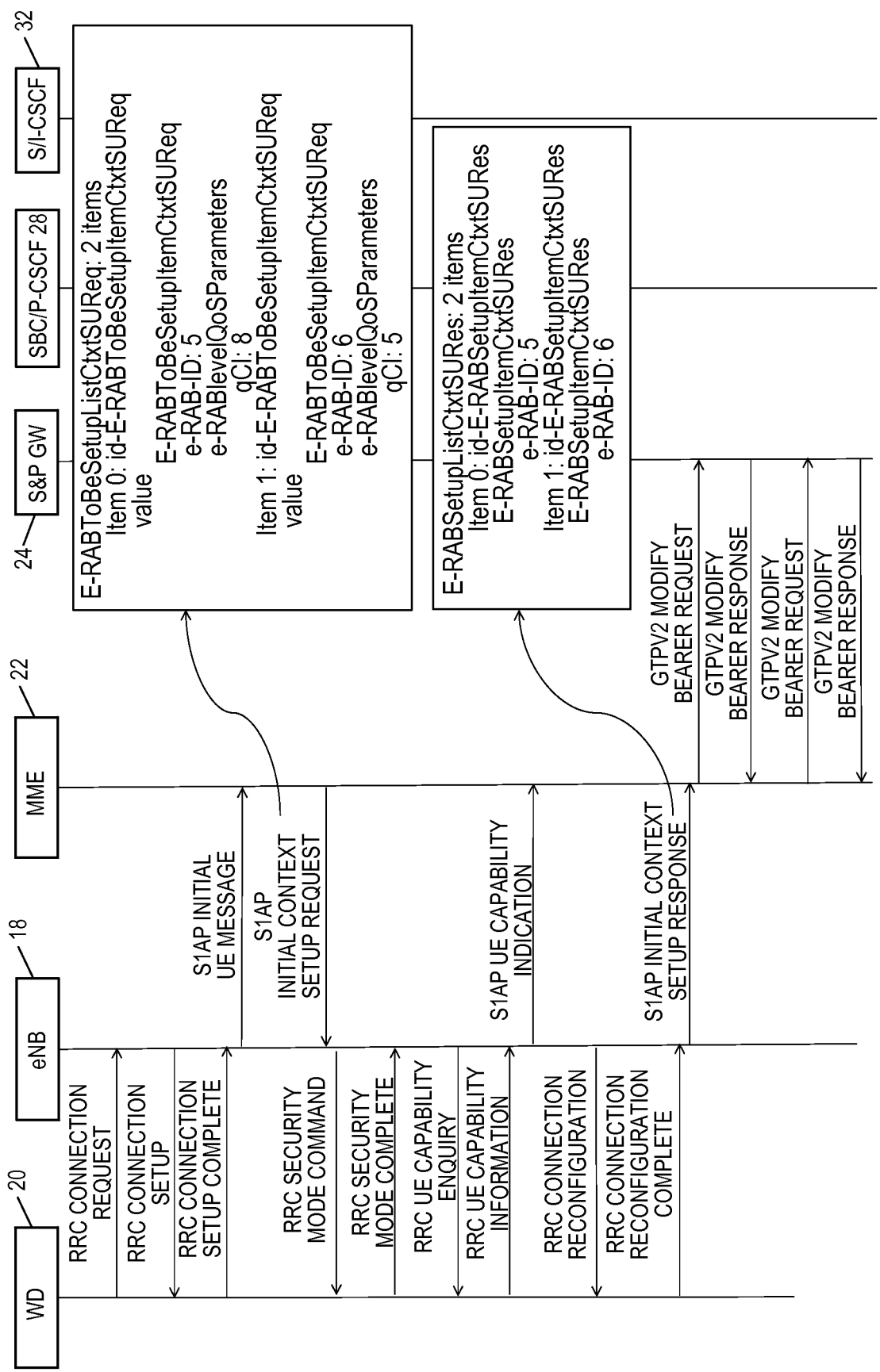
Figure 21B:
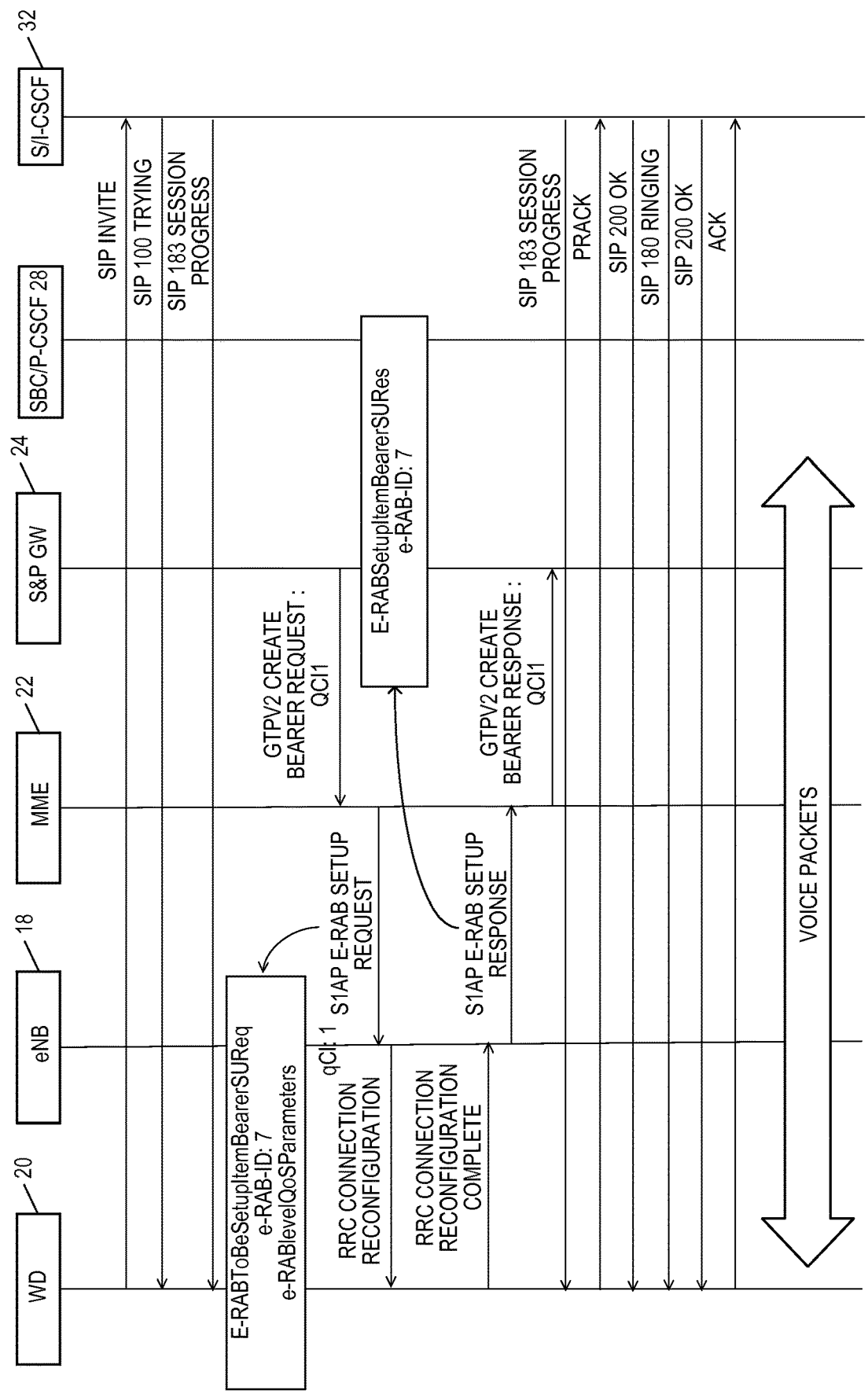

FIGS. 20A and 20B illustrate a process by which the configuration function 60 of the SON server 42 detects and corrects a missing neighbor relation according to some embodiments of the present disclosure. This process may, for example, be performed as or as part of step 104 of FIG. 2 or FIG. 3. As illustrated, the configuration function 60 examines messages in the end-to-end data flow for a VoLTE session to determine whether an LTE bearer(s) was established successfully (step 300) and whether an IMS session was established successfully (step 302) for the VoLTE session. As illustrated in FIGS. 21A and 21B, successful LTE bearer establishment and successful IMS session establishment can be determined by examining the S1AP initial context setup request message from the MME 22 to the eNB 18, the S1AP initial context setup response message from the eNB 18 to the MME 22, the S1AP E-RAB setup request message from the MME 22 to the eNB 18, and the S1AP E-RAB setup response message sent from the eNB 18 to the MME 22. Specifically, if the initial context setup response message for the E-RAB setup response message contains the IE Group 'E-RAB Failed to Setup List', that verifies that the initial context setup or the E-RAB setup failed for the 'E-RAB List' contained within IE Group 'E-RAB Failed to Setup List', as defined in 3GPP TS 36.413. If LTE bearer(s) were not successfully established or if an IMS session was not successfully established, then the process of detecting and correcting a missing neighbor relation ends, at least for this particular VoLTE session for the particular period of time.

If the LTE bearer(s) and the IMS session were successfully established, the configuration function 60 further examines the end-to-end message flow for the VoLTE session to determine whether there was an RRC Reestablishment Request received by a target eNB with the cause set to 'handover failure' (step 304). If not, the process ends. If so, the configuration function 60 examines the end-to-end message flow for the VoLTE session to determine whether an RRC Reestablishment Request was rejected for the same UE (i.e., the same wireless device 20) (step 306). If not, the process ends.

Figure 22:
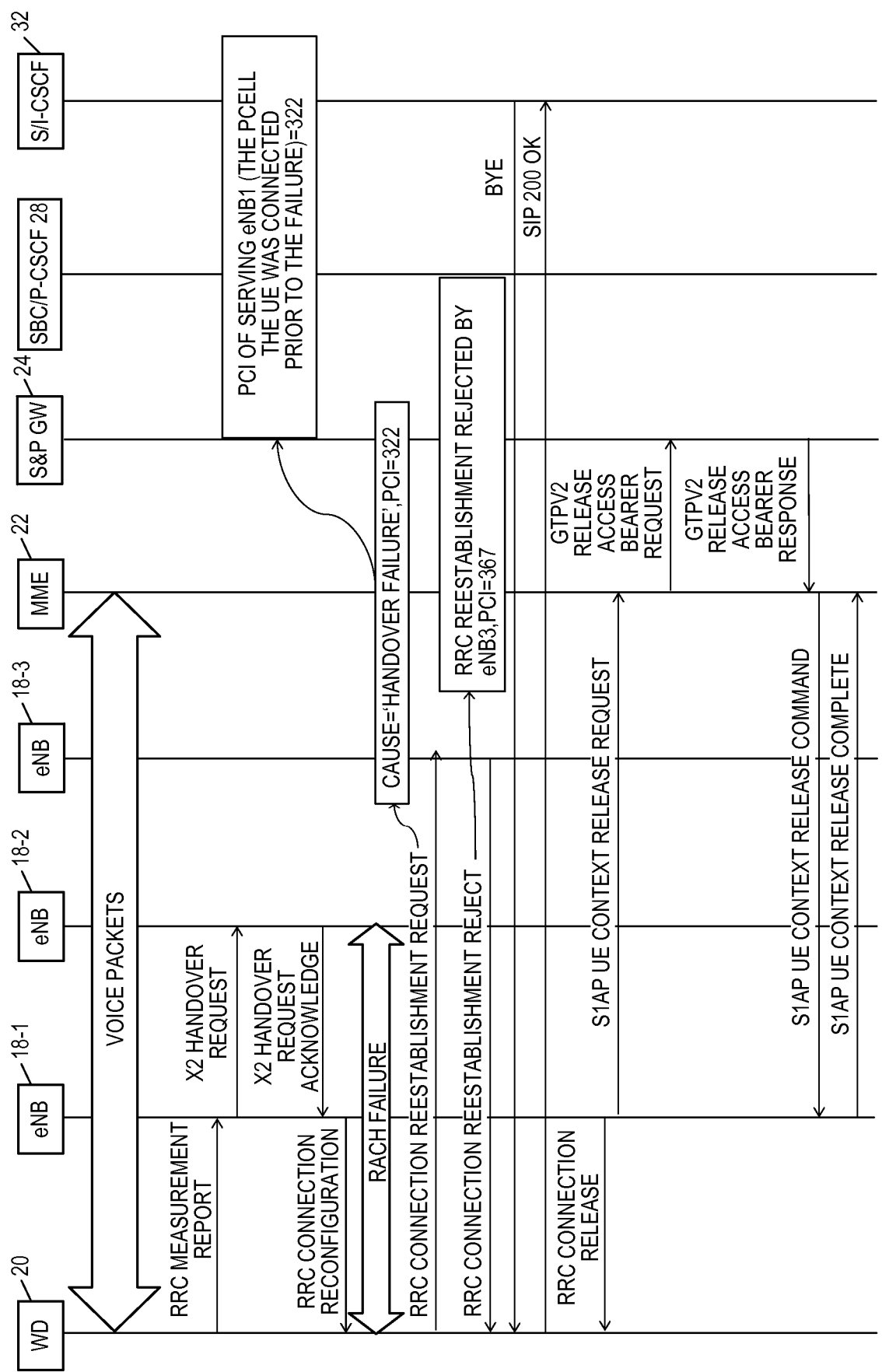

Briefly looking at FIG. 22, the configuration function 60 can examine the end-to-end message flow of the VoLTE session to determine that there was an RRC Connection Reestablishment Request message with a cause being 'handover failure' for the cell (CELL_1) having, in this example, a Physical Cell Identity (PCI) of 322. The configuration function 60 can also examine the end-to-end message flow of the VoLTE session to determine whether there was an RRC Connection Reestablishment Reject message for the same wireless device 20. In this example, the RRC Connection Reestablishment Reject message indicates that the rejection was made by eNB 18-3 for CELL_3 having a PCI of 367.

Figure 23:
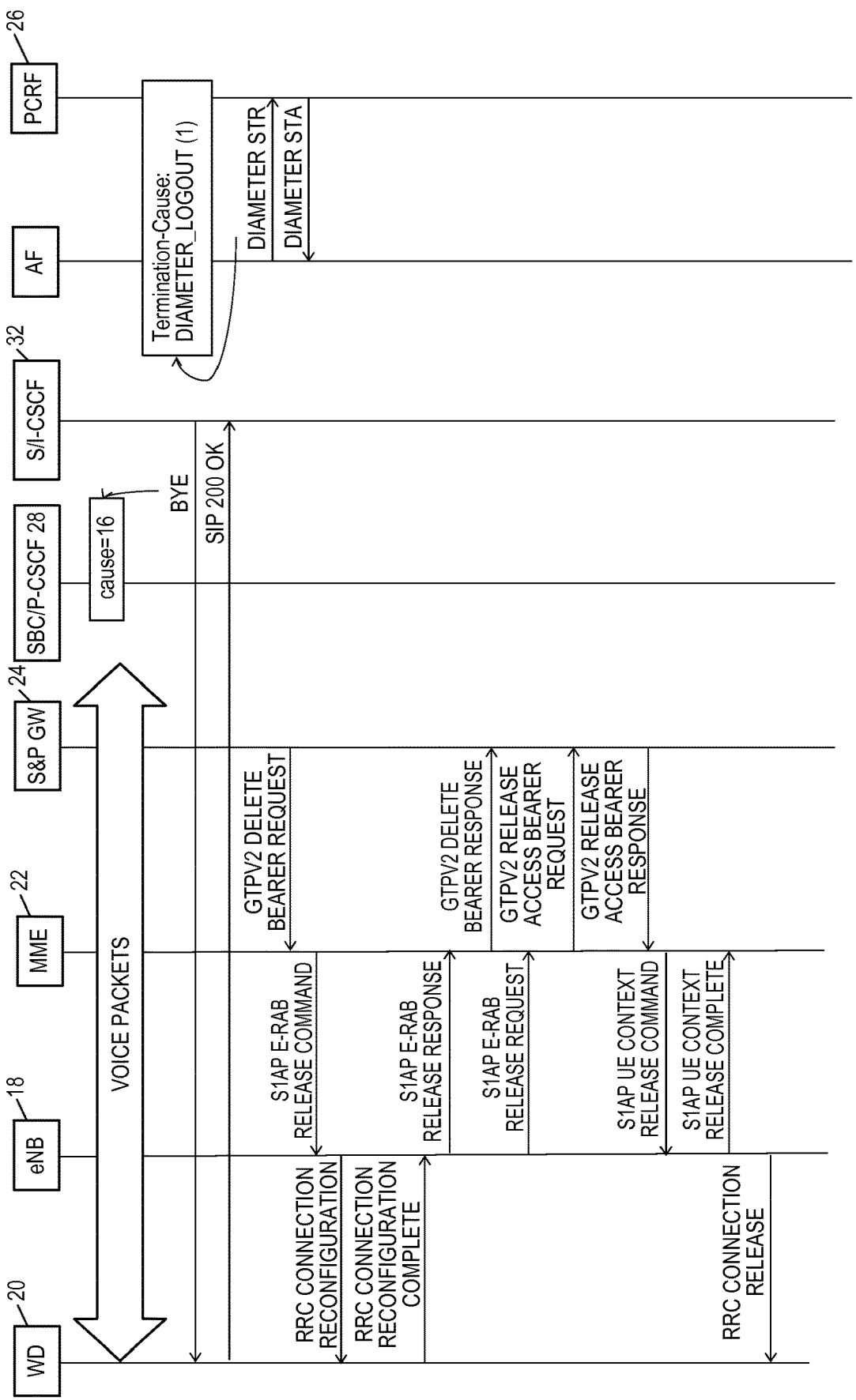

Returning to FIGS. 20A and 20B, if there was an RRC Reestablishment Request Reject message for the same wireless device 20, the configuration function 60 examines the end-to-end message flow for the VoLTE session to determine whether the VoLTE session was terminated abnormally (step 308). As illustrated in FIG. 23, a normal VoLTE session termination can be detected if a SIP BYE message was transmitted from the S/I-CSCF 32 to the wireless device 20 with 'cause=16', and a DIAMETER protocol message including a termination cause of DIAMETER_LOGOUT (1)' is sent from the AF (P-CSCF) to the PCRF 26 for the VoLTE session. Specifically, a normal VoLTE session termination can be detected if the IE-Cause (release cause) available in S1AP E-RAB Release Command or S1AP UE Context Release Command message is not one of a number of predefined abnormal release causes (or equivalently not one of a number of predefined normal release causes). While the normal and abnormal release causes may vary from one vendor to another, as one example, the following release causes may be considered as normal: Normal Release, Handover Successful, User Inactivity, Detach, CS Fallback Triggered, Inter-RAT Redirection, UE Not available for PS Service, and Redirection towards 1×RT. All other causes are considered as abnormal release causes. Again, the list of normal causes may vary.

Returning to FIGS. 20A and 20B, if the VoLTE session was not terminated abnormally, the process ends. Otherwise, the configuration function 60 determines whether the cell to which the wireless device 20 was connected prior to the radio link failure is different than the cell that sent the RRC Connection Reestablishment Reject message (step 310). If not, the process ends. Otherwise, the configuration function 60 gets the corresponding RRC Connection Reestablishment Request message from the end-to-end message flow for the VoLTE session (step 312). In addition, the configuration function 60 gets a physical cell ID of the cell (primary cell) to which the wireless device 20 was connected prior to the radio link failure (step 314). The physical cell ID is available as, for example, the information element in the message RRC Connection Reestablishment Request as defined in 3GPP TS 36.331.

The configuration function 60 determines whether the two cells are already identified as neighbors (i.e., determines whether there is already a neighbor relation for the two cells) (step 316). If so, the process ends. Otherwise, if there is not an existing neighbor relation between the two cells, the configuration function 60 determines whether a geographic distance between the cells is less than a predefined threshold (step 318). More specifically, in some embodiments, the geographic locations of the eNBs serving the two cells are known and stored in, e.g., the database 50. The distance between the two cells may then be represented as the distance between the two eNBs. The predefined distance threshold may be, e.g., static or a function of parameters such as, e.g., sizes of the two cells. If the distance between the two cells is not less than the predefined threshold, the process ends. However, if the distance between the two cells is less than the predefined threshold, then the configuration function 60 adds a neighbor relation for the two cells (step 320).

For instance, in the example of FIG. 26, RRC Connection Reestablishment was rejected as target eNB 18-3 is not defined as a neighbor of the source eNB 18-1. Specifically, in this example, the RRC Connection Reestablishment Request from the UE is rejected by the target eNB 18-3 having PCI=367 (as an example). The RRC Connection Reestablishment Request includes the PCI of the cell with which the UE was connected prior to the RACH failure, which in the example of FIG. 26 is the cell of eNB 18-1, which has a PCI of 322 (as an example). Therefore, when the UE sends the RRC Connection Reestablishment Request to the eNB 18-3, the UE sends CAUSE=HANDOVER FAILURE and PCI=322. So, the target eNB 18-3 needs to be defined as a neighbor of eNB 18-1 if the eNB 18-3 is sufficiently near the eNB 18-1. In this example, eNBs 18-1, 18-2, and 18-3 are E-UTRAN cells. Physical site information (e.g., latitude and longitude of the eNBs 18-1 and 18-3), which may be available in the database 50 of the SON server 42, can be used to calculate the distance between the eNB 18-1 and the eNB 18-3. If the distance is less than the predefined threshold, then the neighbor relation between the eNBs 18-1 and 18-3 is added.

FIGS. 24 and 25 illustrate examples of an RRC Connection Reestablishment Request message and an RRC Connection Reestablishment Reject message, respectively. As illustrated in FIG. 24, the RRC Connection Reestablishment Request message includes the "cause" of the request as well as the PCI of the cell served by the eNB 18-1 prior to, in this example, the radio link failure during handover for the VoLTE session.

As discussed above, the characterization of the end-to-end message flows and, in some embodiments, the automated network optimization based on the end-to-end message flows of the VoLTE sessions may be performed by any suitable network node (e.g., the SON server 42). In this regard, FIG. 27 illustrates a network node 64 according to some embodiments of the present disclosure. The network node 64 may be, for example, the SON server 42, but is not limited thereto. The network node 64 includes at least one processor 66 (e.g., CPU(s), ASIC(s), FPGA(s), etc.), memory 68, and one or more communication interfaces 70 (e.g., a network interface). In some embodiments, at least some of the functionality described herein with respect to the characterization of the end-to-end message flows of VoLTE sessions and, in some embodiments, automated network optimization are implemented in software stored in, e.g., the memory 68. The software is executable by the processor(s) 66, whereby the network node 64 operates to characterize the end-to-end message flows of VoLTE sessions and, in some embodiments, perform automated network optimization according to any of the embodiments described herein.

FIG. 28 is a block diagram of the network node 64 according to other embodiments of the present disclosure. As illustrated, the network node 64 includes a message correlation module 72 and a network configuration module 74, each of which is implemented in software. The message correlation module 72 operates to correlate messages within and across protocols to provide data representative of the end-to-end message flows of VoLTE sessions as described above. The network configuration module 74 is optional and, in some embodiments, operates to provide automated network optimization based on the end-to-end message flows of the VoLTE sessions as described above.

In one embodiment, a computer program including instructions which, when executed by at least one processor, causes the at least one processor to carry out the functionality of the network node 64 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 68).

The systems and methods disclosed herein provide numerous advantages and benefits. While not being limited to any particular advantage or benefit, in some embodiments, the systems and methods described herein provide end-to-end visibility with all possible KPI and interfaces. Using end-to-end message flow, VoLTE service related network issues can be easily identified, analyzed, and pinpointed to the triggering node, interface, event, or configuration settings.

The following acronyms are used throughout this disclosure.

3GPP 3$^{rd}$ Generation Partnership Project
AF Application Function
AP Application Protocol
API Application Programming Interface
APN Access Point Name
AS Application Server
ASIC Application Specific Integrated Circuit
CPU Central Processing Unit
CSCF Call Session Control Function
E-RAB Evolved Universal Terrestrial Radio Access Network Radio Access Bearer
E-RAB-ID Evolved Universal Terrestrial Radio Access Network Radio Access Bearer Identifier
E-UTRAN Evolved Universal Terrestrial Radio Access Network
eNB Enhanced or Evolved Node B
EPC Evolved Packet Core
EPS Evolved Packet System
F-TEID Fully Qualified Tunnel Endpoint Identifier
FPGA Field-Programmable Gate Array
GRE Generic Routing Encapsulation
GPRS General Packet Radio Service
GSM Global System for Mobile Communications
GTP-C General Packet Radio Service Tunneling Protocol-Control Plane
GTP-U General Packet Radio Service Tunneling Protocol-User Plane
GTPv2 General Packet Radio Service Tunneling Protocol version 2
GW Gateway
HSPA High Speed Packet Access
HSS Home Subscriber Server
I-CSCF Interrogating Call Session Control Function
ID Identifier
IMS Internet Protocol Multimedia Subsystem
IMSI International Mobile Subscriber Identity
IP Internet Protocol
KPI Key Performance Indicator
LTE Long Term Evolution
MME Mobility Management Entity
MMEC Mobility Management Entity Code
MMEGI Mobility Management Entity Group Identity
MMTEL Multimedia Telephony
MSISDN Mobile Subscriber Integrated Services Digital Network Number
MTAS Multimedia Telephony Application Server
M-TMSI Mobility Management Entity Temporary Mobile Subscriber Identity
NAS Non-Access Stratum
OSS Operations Support System
P-GW Packet Data Network Gateway
PCAP Packet Capture
PCI Physical Cell Identity
PCRF Policy and Charging Rules Function
P-CSCF Proxy-Call Session Control Function
PDN Packet Data Network
QCI Quality of Service Class Indicator
QoS Quality of Service
RAN Radio Access Network
RLC Radio Link Control
RRC Radio Resource Control
RTP Real-Time Transfer Protocol
S/I-CSCF Serving/Interrogating Call Session Control Function
S&P Serving and Packet Data Network
S-CSCF Serving Call Session Control Function
S-eNB Serving Enhanced or Evolved Node B
S-GW Serving Gateway
SBC Session Border Controller
SIP Session Initiation Protocol
SN Sequence Number
SON Self-Organizing Network
SSRC Synchronization Source
T-eNB Target Enhanced or Evolved Node B
TA Tracking Area
TEID Tunnel Endpoint Identifier
UDP User Datagram Protocol
UE User Equipment
VoIP Voice over Internet Protocol
VoLTE Voice over Long Term Evolution Those skilled in the art will recognize improvements and modifications to the embodiments of the present disclosure. All such improvements and modifications are considered within the scope of the concepts disclosed herein and the claims that follow.

What is claimed is:

1. A method of operation of a network node to perform automated end-to-end analysis of Voice over Long Term Evolution, VoLTE, sessions, comprising:
    correlating control and data plane messages across a plurality of nodes and interfaces in a VoLTE network to thereby provide data representative of end-to-end message flows for a plurality of VoLTE sessions, where the control plane is used to transmit control messages in the VoLTE network and the data plane is used to transmit data messages in the VoLTE network; and
    configuring one or more nodes in the VoLTE network based on the data representative of the end-to-end message flows for the plurality of VoLTE sessions.

2. The method of claim 1 wherein correlating the control and data plane messages across the plurality of nodes and interfaces in the VoLTE network comprises:
    bundling control and/or data messages for each of a plurality of protocols that define the control and data plane messages for the plurality of nodes and interfaces in the VoLTE network for each of the plurality of VoLTE sessions to thereby provide a message bundle for each of the plurality of VoLTE sessions for each of the plurality of protocols; and
    correlating the message bundles across the plurality of protocols for each of the plurality of VoLTE sessions to thereby provide the data representative of the end-to-end message flows for the plurality of VoLTE sessions.

3. The method of claim 2 wherein bundling the control and/or data messages for each of the plurality of protocols for each of the plurality of VoLTE sessions comprises bundling Radio Resource Control, RRC, messages according to rlc.channel.ueid.

4. The method of claim 2 wherein bundling the control and/or data messages for each of the plurality of protocols for each of the plurality of VoLTE sessions comprises bundling X2 Application Protocol, AP, messages according to a unique pair of old-eNB-UE-X2AP-ID and new-eNB-UE-X2AP-ID.

5. The method of claim 2 wherein bundling the control and/or data messages for each of the plurality of protocols for each of the plurality of VoLTE sessions comprises bundling S1 Application Protocol, AP, messages according to a unique pair of eNB-UE-S1AP-ID and MME-UE-S1AP-ID.

6. The method of claim 2 wherein bundling the control and/or data messages for each of the plurality of protocols for each of the plurality of VoLTE sessions comprises bundling General Packet Radio Service, GPRS, Tunneling Protocol version 2, GTPv2, protocol messages according to a unique pair of Tunnel Endpoint Identifiers, TEIDs.

7. The method of claim 2 wherein bundling the control and/or data messages for each of the plurality of protocols for each of the plurality of VoLTE sessions comprises bundling Session Initiation Protocol, SIP, messages based on sip.Call-IDs and sip.P-Charging-Vector.

8. The method of claim 2 wherein bundling the control and/or data messages for each of the plurality of protocols for each of the plurality of VoLTE sessions comprises bundling DIAMETER messages based on subscription-Identifier, ID.

9. The method of claim 2 wherein bundling the control and/or data messages for each of the plurality of protocols for each of the plurality of VoLTE sessions comprises bundling Real-time Transfer Protocol, RTP, messages based on a unique pair of Synchronization Source, SSRC, identifiers and a unique pair sip.Route.host and sip.Via.sent-by.address Internet Protocol, IP, addresses.

10. The method of claim 2 wherein:
bundling the control and/or data messages for each of the plurality of protocols for each of the plurality of VoLTE sessions comprises:
  bundling Radio Resource Control, RRC, messages to thereby provide a bundle of RRC messages for each of the plurality of VoLTE sessions; and
  bundling X2 Application Protocol, X2AP, messages to thereby provide a bundle of X2AP messages for each of the plurality of VoLTE sessions; and
correlating the message bundles across the plurality of protocols for each of the plurality of VoLTE sessions comprises, for each VoLTE session of the plurality of VoLTE sessions, correlating the bundle of RRC messages for the VoLTE session and the bundle of X2AP messages for the VoLTE session based on Mobility Management Entity Group Identity, MMEGI, and Mobility Management Entity Code, MMEC.

11. The method of claim 2 wherein:
bundling the control and/or data messages for each of the plurality of protocols for each of the plurality of VoLTE sessions comprises:
  bundling X2 Application Protocol, X2AP, messages to thereby provide a bundle of X2AP messages for each of the plurality of VoLTE sessions; and
  bundling S1 Application Protocol, S1AP, messages to thereby provide a bundle of S1AP messages for each of the plurality of VoLTE sessions; and
correlating the message bundles across the plurality of protocols for each of the plurality of VoLTE sessions comprises, for each VoLTE session of the plurality of VoLTE sessions, correlating the bundle of X2AP messages for the VoLTE session and the bundle of S1AP messages for the VoLTE session based on MME-UE-S1AP-ID.

12. The method of claim 2 wherein:
bundling the control and/or data messages for each of the plurality of protocols for each of the plurality of VoLTE sessions comprises:
  bundling Radio Resource Control, RRC, messages to thereby provide a bundle of RRC messages for each of the plurality of VoLTE sessions; and
  bundling S1 Application Protocol, S1AP, messages to thereby provide a bundle of S1AP messages for each of the plurality of VoLTE sessions; and
correlating the message bundles across the plurality of protocols for each of the plurality of VoLTE sessions comprises, for each VoLTE session of the plurality of VoLTE sessions, correlating the bundle of RRC messages for the VoLTE session and the bundle of S1AP messages for the VoLTE session based on Mobility Management Entity Code, MMEC, and M-Temporary Mobile Subscriber Identity, M-TMSI.

13. The method of claim 2 wherein:
bundling the control and/or data messages for each of the plurality of protocols for each of the plurality of VoLTE sessions comprises:
  bundling S1 Application Protocol, S1AP, messages to thereby provide a bundle of S1AP messages for each of the plurality of VoLTE sessions; and
  bundling General Packet Radio Service, GPRS, Tunneling Protocol version 2, GTPv2, messages to thereby provide a bundle of GTPv2 messages for each of the plurality of VoLTE sessions; and
correlating the message bundles across the plurality of protocols for each of the plurality of VoLTE sessions comprises, for each VoLTE session of the plurality of VoLTE sessions, correlating the bundle of S1AP messages for the VoLTE session and the bundle of GTPv2 messages for the VoLTE session based on S1AP-GTP-TEID and F-TEID S1-U SGW GTP-U INTERFACE TEID/GRE KEY.

14. The method of claim 2 wherein:
bundling the control and/or data messages for each of the plurality of protocols for each of the plurality of VoLTE sessions comprises:
  bundling General Packet Radio Service, GPRS, Tunneling Protocol version 2, GTPv2, messages to thereby provide a bundle of GTPv2 messages for each of the plurality of VoLTE sessions; and
  bundling Session Initiation Protocol, SIP, messages to thereby provide a bundle of SIP messages for each of the plurality of VoLTE sessions; and
correlating the message bundles across the plurality of protocols for each of the plurality of VoLTE sessions comprises, for each VoLTE session of the plurality of VoLTE sessions, correlating the bundle of GTPv2 messages for the VoLTE session and the bundle of SIP messages for the VoLTE session based on Mobile Subscriber Integrated Services Digital Network Number, MSISDN.

15. The method of claim 2 wherein:
bundling the control and/or data messages for each of the plurality of protocols for each of the plurality of VoLTE sessions comprises:
  bundling Session Initiation Protocol, SIP, messages to thereby provide a bundle of SIP messages for each of the plurality of VoLTE sessions; and
  bundling Real-time Transfer Protocol, RTP, messages to thereby provide a bundle of RTP messages for each of the plurality of VoLTE sessions; and
correlating the message bundles across the plurality of protocols for each of the plurality of VoLTE sessions comprises, for each VoLTE session of the plurality of VoLTE sessions, correlating the bundle of SIP messages for the VoLTE session and the bundle of RTP messages for the VoLTE session based on SIP.VIA-.SENT-BY.ADDRESS and SIP.ROUTE-HOST in the bundle of SIP messages and IP.SRC, and IP.DST in the bundle of RTP messages.

16. The method of claim 1 wherein configuring the one or more nodes in the VoLTE network comprises:
   determining that one or more predefined conditions are satisfied based on the data representative of the end-to-end message flow for at least one of the plurality of VoLTE sessions; and
   adjusting a configuration for the one or more nodes in the VoLTE network in response to determining that the one or more predefined conditions are satisfied based on the data representative of the end-to-end message flow for at least one of the plurality of VoLTE sessions.

17. The method of claim 1 wherein configuring the one or more nodes in the VoLTE network comprises:
   obtaining an Evolved Universal Radio Access Network, E-UTRAN, Radio Access Bearer, E-RAB, Identifier, E-RAB-ID, and Quality of Service Class Indicator, QCI, value from an E-RAB setup request in the data representative of the end-to-end message flow for one of the plurality of VoLTE sessions;
   determining that E-RAB setup was not successful for the one of the plurality of VoLTE sessions based on an E-RAB setup response;
   in response to determining that the E-RAB setup was not successful, determining that a failure cause included in the E-RAB setup response indicates that the E-RAB setup was not successful because the QCI value is not supported by a target base station for the E-RAB setup; and
   in response to determining that the failure cause included in the E-RAB setup response indicates that the E-RAB setup was not successful because the QCI value is not supported by the target base station for the E-RAB setup, defining a QCI profile corresponding to the QCI value in the target base station.

18. The method of claim 1 wherein configuring the one or more nodes in the VoLTE network comprises:
   determining that a first cell is a missing neighbor of a second cell based on the data representative of the end-to-end message flow for one of the plurality of VoLTE sessions; and
   in response to determining that the first cell is a missing neighbor of the second cell, adding a neighbor relation for the first cell and the second cell.

19. The method of claim 18 wherein determining that the first cell is a missing neighbor of the second cell comprises:
   determining that one or more bearers were successfully established for the one of the plurality of VoLTE sessions based on the data representative of the end-to-end message flow for one of the plurality of VoLTE sessions;
   determining that an Internet Protocol Multimedia Subsystem, IMS, session was successfully established in an IMS for the one of the plurality of VoLTE sessions based on the data representative of the end-to-end message flow for one of the plurality of VoLTE sessions;
   determining that a Radio Resource Control, RRC, reestablishment request was received from a wireless device due to a handover failure for the one of the plurality of VoLTE sessions based on the data representative of the end-to-end message flow for one of the plurality of VoLTE sessions;
   determining that an RRC reestablishment request was rejected for the wireless device;
   determining that the one of the plurality of VoLTE sessions was terminated abnormally;
   determining that the first cell to which the wireless device was connected prior to radio link failure is different than the second cell that rejected the RRC reestablishment request;
   determining that the first cell and the second cell are not defined as neighbors; and
   determining that a physical distance between the first cell and the second cell is less than a predefined threshold.

20. A network node enabled to perform automated end-to-end analysis of Voice over Long Term Evolution, VoLTE, sessions, comprising:
   at least one processor; and
   memory containing software executable by the at least one processor whereby the network node is configured to:
      correlate control and data plane messages across a plurality of nodes and interfaces in a VoLTE network to thereby provide data representative of end-to-end message flows for a plurality of VoLTE sessions, where the control plane is used to transmit control messages in the VoLTE network and the data plane is used to transmit data messages in the VoLTE network; and
   configure one or more nodes in the VoLTE network based on the data representative of the end-to-end message flows for the plurality of VoLTE sessions.

* * * * *